United States Patent

Patch et al.

[11] Patent Number: 6,126,901
[45] Date of Patent: Oct. 3, 2000

[54] DETECTING LOW LEVELS OF RADIONUCLIDES IN FLUIDS

[75] Inventors: Keith D. Patch, Lexington; Dean T. Morgan, Sudbury, both of Mass.

[73] Assignee: Thermo Power Corporation, Waltham, Mass.

[21] Appl. No.: 08/902,341

[22] Filed: Jul. 29, 1997

Related U.S. Application Data

[63] Continuation-in-part of application No. 08/323,818, Oct. 17, 1994, Pat. No. 5,652,013.
[51] Int. Cl.[7] .......................... G01N 24/00; G01N 21/00
[52] U.S. Cl. .............................. 422/64; 422/71; 436/48; 436/49; 436/57
[58] Field of Search .................... 422/56, 58, 61, 422/70, 71, 62–67; 436/43–54, 164, 169, 172, 57

[56] References Cited

U.S. PATENT DOCUMENTS

| | | | |
|---|---|---|---|
| 4,234,628 | 11/1980 | DuRose | 427/305 |
| 4,282,287 | 8/1981 | Giese | 428/407 |
| 4,478,914 | 10/1984 | Giese | 428/407 |
| 4,797,187 | 1/1989 | Davis et al. | 204/180 |
| 5,250,262 | 10/1993 | Heidt et al. | 422/64 |
| 5,326,626 | 7/1994 | Chidsey et al. | 427/301 |
| 5,498,545 | 3/1996 | Vestal | 436/47 |
| 5,637,506 | 6/1997 | Goken et al. | 422/71 |

Primary Examiner—Lyle A. Alexander
Attorney, Agent, or Firm—Fish & Richardson P.C.

[57] ABSTRACT

An apparatus and method for detecting low levels of one or more radionuclides in a fluid sample uses a substrate that includes an ion exchange resin or other sorbent material to collect the radionuclides. A collecting apparatus includes a collecting chamber that exposes the substrate to a measured amount of the fluid sample such that radionuclides in the fluid sample are collected by the ion exchange resin. A drying apparatus, which can include a drying chamber, then dries the substrate. A measuring apparatus measures emissions from radionuclides collected on the substrate. The substrate is positioned in a measuring chamber proximate to a detector, which provides a signal in response to emissions from the radionuclides. Other analysis methods can be used to detect non-radioactive analytes, which can be collected with other types of sorbent materials.

40 Claims, 28 Drawing Sheets

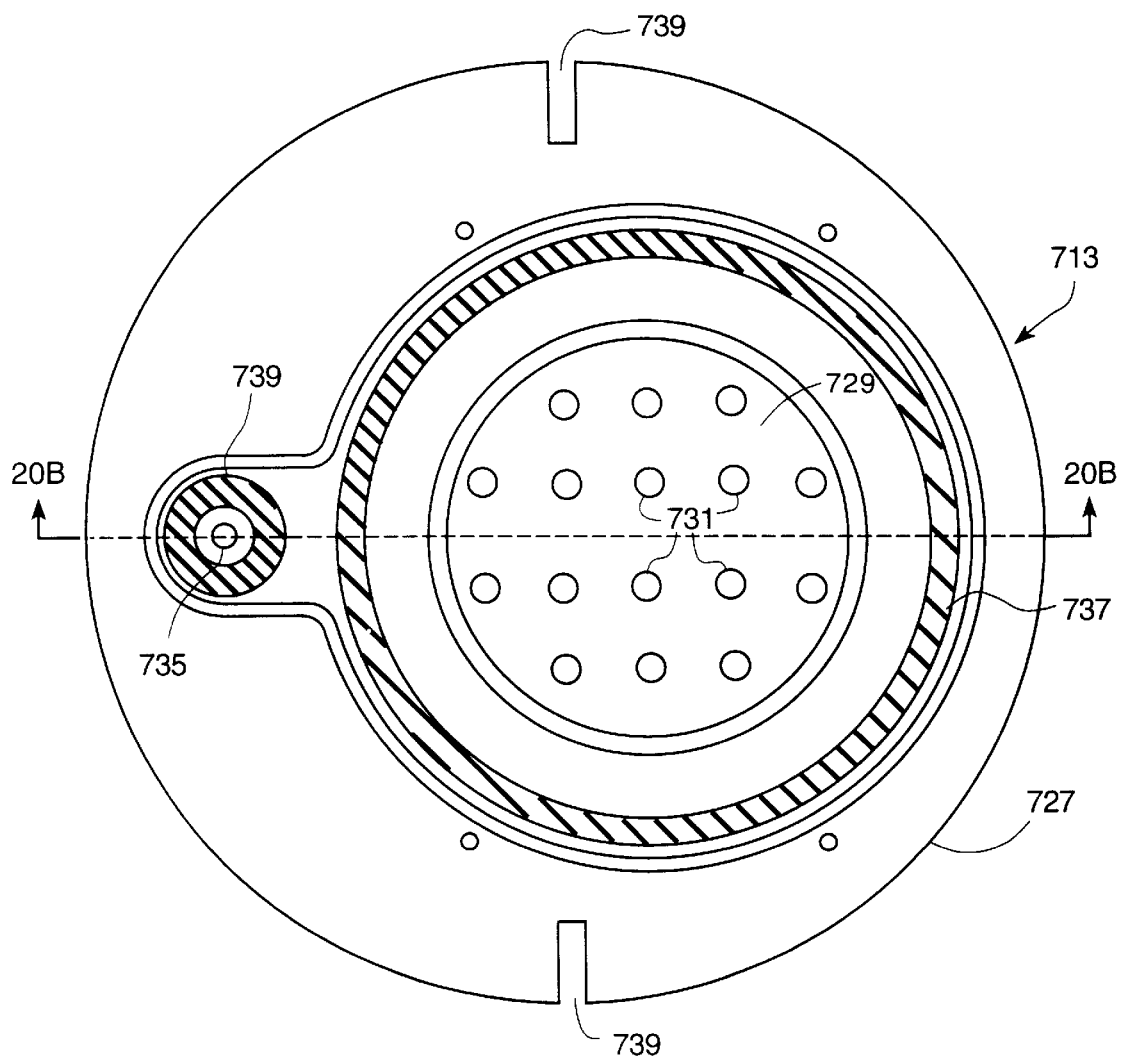

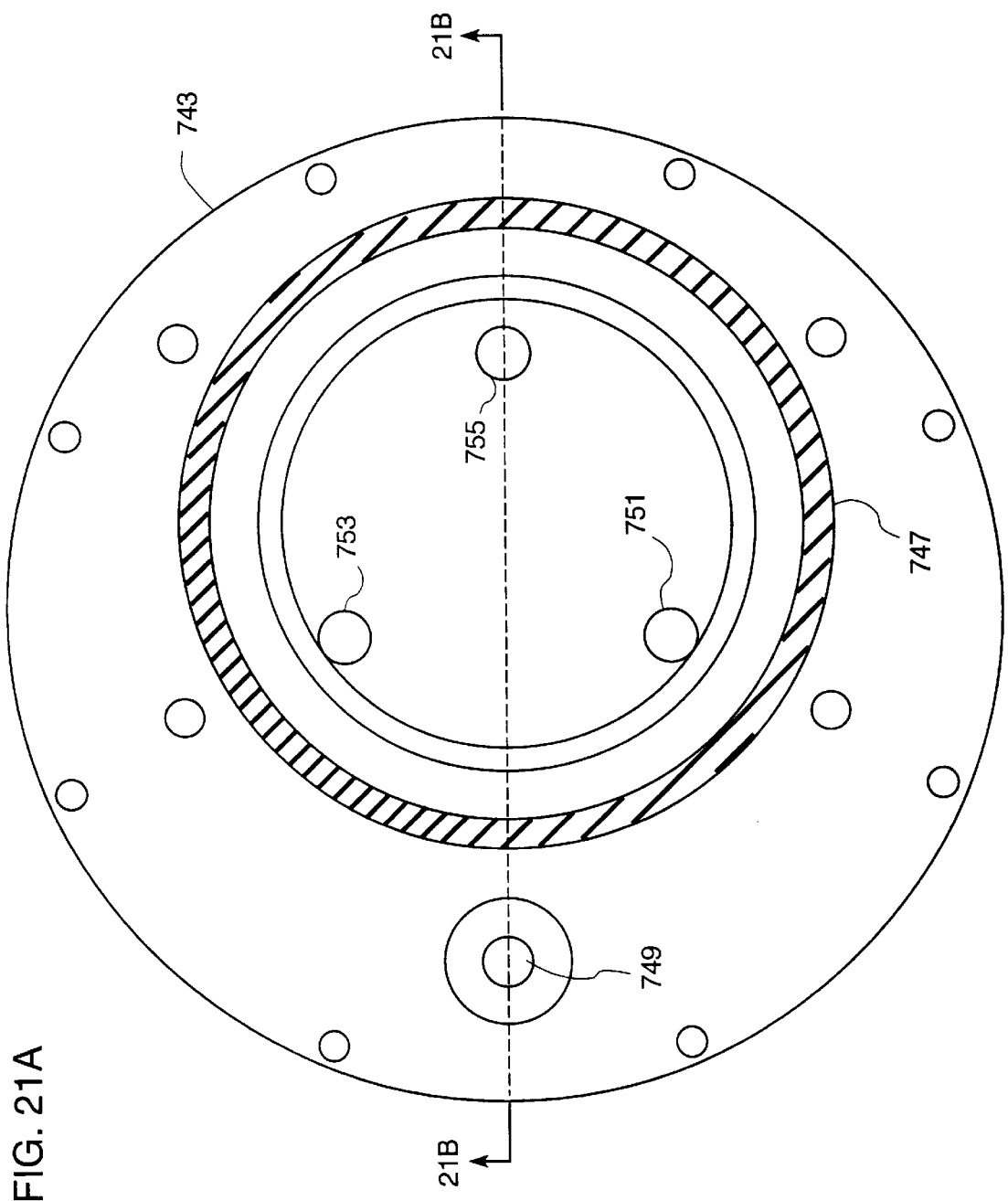

DETECTING LOW LEVELS OF RADIONUCLIDES IN FLUIDS

This application is a continuation in part of co-pending application Ser. No. 08/323,818, filed Oct. 17, 1994, entitled Chemical Enhancement Of Surface Deposition, issued on Jul. 29, 1997 as U.S. Pat. No. 5,652,013, by Keith D. Patch, et al.

This invention was made with Government support under Contracts No. DE-AC05-91OR21949 and No. DE-AR21-95MC32088, both awarded by the Department of Energy. The Government has certain rights in this invention.

BACKGROUND

This invention relates to methods and apparatus for measuring and monitoring concentrations of dissolved radionuclides in fluid samples.

Radioactive elements (i.e., radionuclides), such as natural uranium ($U^{235}/U^{238}/U^{234}$) and man-made uranium ($U^{237}$) decay and emit alpha and beta particles having, respectively, energies between 4–10 MeV and 0.1–1.0 MeV. The emitted particles can be detected in air, water, soil, or other samples to determine the level of radioactivity. In particular, samples taken from sites near weapons and fuel production facilities may contain concentrations of alpha-emitting radionuclides in excess of permitted levels.

Uranium is rated by the U.S. Environmental Protection Agency (EPA) as being a "class-A carcinogen" at very low levels. In addition, this element has a high chemical toxicity; the EPA-proposed maximum concentration limit (MCL) for uranium in public drinking water supplies is 13.5 pCi/l (about 20 ppb). Uranium present in this concentration in 1 liter of water emits about 30 alpha particles each minute.

Currently, process, surface and ground waters at contaminated sites are monitored for alpha-emitters and other contaminants by intermittent sampling. These samples are chemically preserved by the addition of acid, entered into a chain of custody infrastructure, packaged for shipment and then sent to a central laboratory for analysis. Because the permitted levels of radionuclides are low, analysis in the laboratory usually involves a lengthy and costly procedure for separating the radionuclides from the water sample, concentrating them to form a thin layer, and then measuring the emission from the layer. For example, during a typical analytical testing procedure, the alpha-emitting radionuclides are separated from a water sample either by precipitation or evaporation; the separated radionuclides are then plated on a planchet (i.e., a glass or metal surface) and the emission is counted in vacuum using a biased silicon detector. The detected signals are then analyzed to determine the radionuclide concentration, which is then reported to the requester.

Because the sample analysis is typically done off-site at a remote laboratory, the current radionuclide-monitoring procedure has several shortcomings. For example, large variations in radionuclide concentrations at the site can go undetected due to the sporadic sampling necessarily involved with the collection/analysis procedure. Due to the high cost of the procedure, only limited numbers of samples are typically taken. In addition, the analysis may be inaccurate because of the time-dependent concentrations of radionuclides at the site; the amount of radionuclides detected in the off-site laboratory may not necessarily be representative of the current on-site concentrations. The current method is prone to errors because of the many handling steps involved. The current method is also unsuitable for process control because of the long time delay between collection and analysis.

SUMMARY

In general, in one aspect, the invention provides a method of detecting low levels of an analyte, such as, for example, dissolved radionuclides in a fluid sample. The method includes collecting an analyte from a fluid sample by exposing a substrate that comprises an ion exchange resin or other sorbent material to a measured amount of the fluid sample; preparing the substrate for measuring a characteristic of the analyte, for example, drying the substrate; and measuring the characteristic of the analyte collected on the substrate by employing a measuring system resposive to the characteristic.

In another aspect, the invention provides an apparatus for detecting low levels of a radionuclide in a fluid sample. The apparatus includes a substrate comprising an ion exchange resin or other sorbent material; a collecting apparatus, including a collecting chamber adapted to expose the substrate to a measured amount of the fluid sample such that an analyte in the fluid sample can be collected by the sorbent material; a developing apparatus adapted to prepare the substrate for measuring a characteristic of the analyte after being exposed to the fluid sample in the collecting chamber; and a measuring system, including a measuring chamber and a detector capable of providing a signal responsive to the characteristic of the analyte when the substrate is inside the measuring chamber.

In both the method and the apparatus, the ion exchange resin can include an ion exchange resin that preferentially attracts anions, cations, or both. The sorbent material can be a material that sorbs organic analytes.

The fluid sample may be gaseous or liquid.

The substrate can include a porous media made of a fibrous material, for example, an expanded PTFE material, that carries the sorbent material. The collecting apparatus can be adapted to expose the porous media substrate to the fluid sample by passing the measured amount of fluid sample through the porous media. The collecting apparatus can be adapted to employ a vacuum to draw (or to employ a pressure to force) the measured amount of fluid sample through the porous media.

The substrate may alternatively include a continuous de-ionization (CDI) membrane. The CDI membrane may include an approximately 50:50 mix of polyethylene and the ion exchange resin extruded into a thin film, which may include a support media, the ion exchange resin being finely ground before being mixed with the polyethylene and extruded.

In yet another embodiment, the substrate includes a lacquer containing the ion exchange material applied to one side of a reverse osmosis (RO) membrane media having a fabric backing on its other side, the ion exchange resin being finely divided in the lacquer.

In the CDI membrane and RO membrane embodiments, the collecting apparatus can be adapted to increase a flow rate of the measured amount of fluid sample contacting the ion exchange material to increase a collecting deposition rate of the radionuclide on the substrate. The collecting apparatus may be structured to increase the flow rate by delivering the measured amount of fluid sample to the substrate as one or more high-pressure streams onto the ion exchange material. The flow rate can also be increased by mechanically stirring the measured amount of fluid sample, the collecting apparatus including a stirring mechanism.

The substrate may be in the form of an individual disc, or may be in a strip form, wherein an elongated, flat media carries the sorbent material. The strip form can be used for continuous monitoring.

The developing apparatus can include a drying chamber structured to dry the substrate. The collecting chamber, the drying chamber and the measuring chamber can be cooperatively adapted for continuously transporting the strip form substrate in stepwise motion to the collecting chamber, then to the drying chamber and then to the measuring chamber for the respective steps of collecting, drying, and measuring.

The analyte can include one or more dissolved radionuclides, with the characteristic of the analyte being emissions from the radionuclides, and wherein the detector provides signals in response to the emissions. The measuring system may further include processing electronics responsive to the signals from the detector for determining a total activity level of the fluid sample based upon the measured amount of the fluid sample and a measured emission rate from the substrate. The processing electronics may be configured to provide a spectrum of the measured emissions and to identify a species of the one or more radionuclides in the sample fluid based on the spectrum. The processing electronics can be confgured to determine a concentration of the identified species based on the measured amount of fluid sample and the spectrum.

The detector can be an alpha detector, a beta detector, an x-ray detector or gamma ray detector. For measuring other characteristics of the analyte, a measuring system may employ a detector for measuring x-ray induced fluorescence, laser induced fluorescence, measuring raman spectra or infrared spectra. More than one type of detector can be used in the detection chamber.

The use of an ion exchange or other sorbent material on a substrate to collect the radionuclide affords several benefits. This technique improves detection limits for low-level radionuclides, due to more rapid uptake of radioactive species on the ion exchange material. A monitor using this technology can be sensitive to elements lighter than lead, such as fission products, for example, $TcO_4^{2-}$. The monitor's sensitivity is also extended to additional dissolved chemical species, such as anions.

Accordingly, the radionuclide detector using a collecting substrate formed with an ion exchange resin has an increased sensitivity, and can be used on-site to rapidly measure alpha or beta particle emission in a cost-efficient manner. This allows, for example, high-resolution, real-time monitoring of natural or man-made radionuclides, such as uranium, plutonium, and cesium.

Because the substrate is used only once, an archival record of the sample can be maintained by keeping the substrate in storage.

Separating the liquid sampling and nuclear counting operations into sequential steps eliminates the need for maintaining a liquid-tight detector, or for cleaning the detection chamber with cleaning solutions or deionized water.

Accelerated gross alpha counting is now possible when using a substrate configured for extra sensitivity, low energy resolution counting. Gammas can also be detected in addition to alphas and betas by integrating an appropriate detector in the nuclear counting step. The system can also be used for isotopic identification with the use of an appropriate detector.

In addition, the rate of collection and thus the monitoring sensitivity can be increased by increasing a flow of the sample solution over the substrate surface, for example, with jet impingement or rapid stirring of the sample.

On-line, near real-time, isotopically-resolved alpha monitoring of liquids is made possible using a continuously-fed film that is sequentially passed through a liquid collection chamber, a drying chamber and a counting chamber.

The invention has several advantages. It is isotopically sensitive to low levels of a broad range of isotopes. For example, sensitivities of 10 parts per trillion total uranium, which is 1/2,000th of the EPA's drinking water limit of 20 ppb total uranium, can be achieved. Sensitivities of less than 20 ppb natural uranium can be obtained with a shortened on-line response time of less than fifteen minutes.

Because sample handling is virtually eliminated, the present invention can provide substantial cost saveings over currently used analysis methods.

BRIEF DESCRIPTION OF THE DRAWINGS

FIG. 20A is a top plan view of a substrate holder, and

FIG. 21A is a bottom plan view of a collecting chamber, and

DETAILED DESCRIPTION

Figure 1:
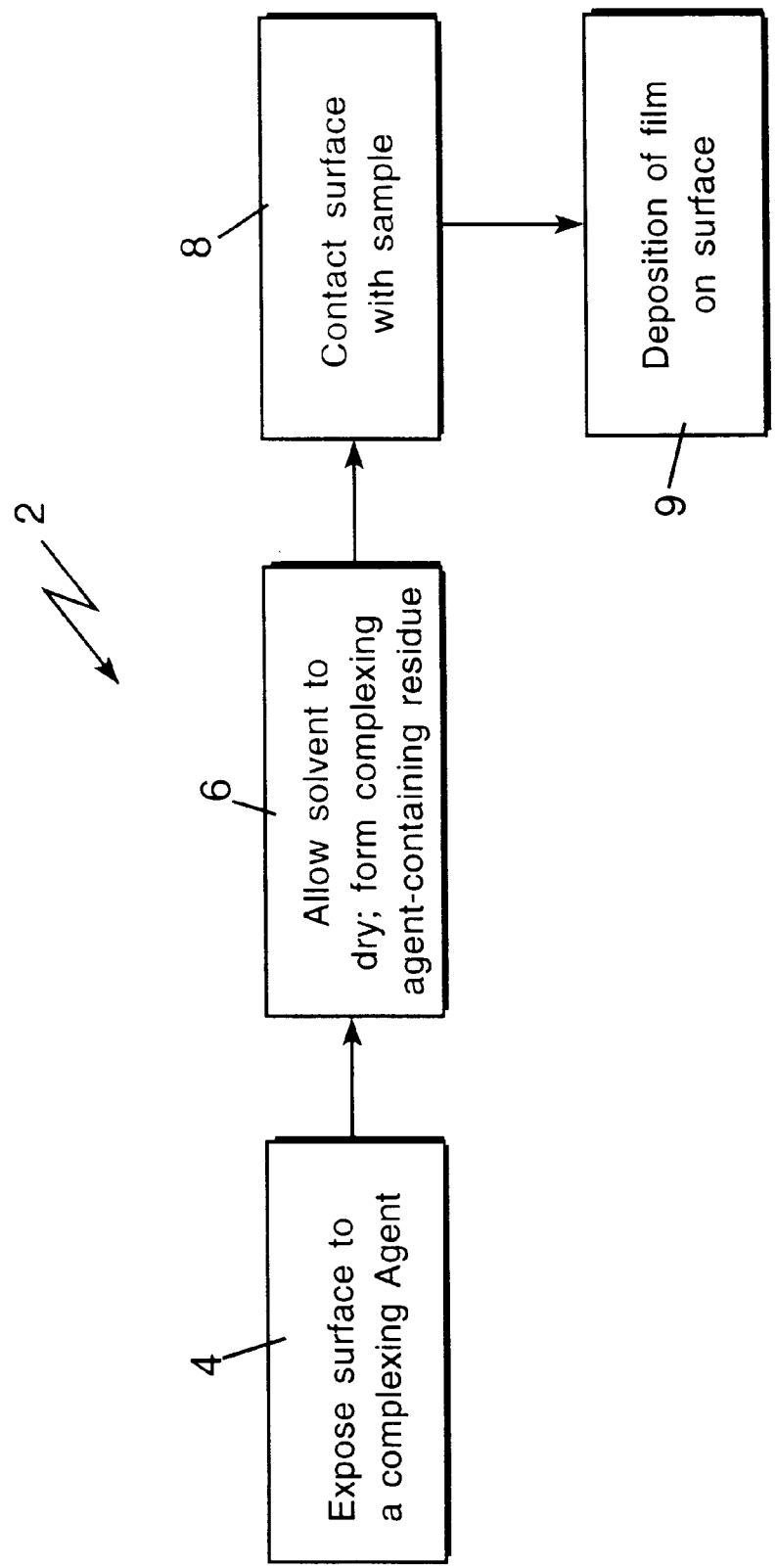
FIG. 1 is a schematic view of the steps used in the surface adsorption method according to the invention.

Referring now to FIG. 1, a method 2 for increasing the rate of deposition of ions onto a surface, such as a detecting surface of a radionuclide detector, includes the step 4 of treating the surface with a solution containing an aqueous or non-aqueous solvent and a complexing agent having an affinity for the ion, resulting in the formation of a thin complexing agent-containing residue on the surface. For example, phosphate ions formed by the dissolution of phosphoric acid in acetone or an acetone/water mixture may be formed in a solution, and then deposited by soaking the surface in the solution and allowing the surface to dry. The complexing agent may also be applied to the surface in an aerosolized or gaseous form. Alternatively, the complexing agent may be left in a liquid phase on the surface. In this case, the complexing agent may be dissolved in an oil on the surface, or may be suspended in a capillary network in contact with or contained within the surface. Preferably, the residue forms a continuous film of substantially even thickness on the surface. The complexing agent-containing solution may also be deposited in a porous material, which is then placed in contact with the surface. Alternatively, if the surface is porous, the solution may be deposited therein. When a suitable amount of the complexing agent-containing residue is deposited, the surface is contacted 8 with a fluid sample containing the ions of interest, allowing the ions to react with the complexing agents. In this way, the complexing agents are made available to complex with the ions present in the fluid solution. For example, when the surface is treated with phosphoric acid, ionic forces between the phosphate ion and the uranyl ion ($UO^{2+}$) present in aqueous solutions of uranium drives the complexation between these two species, resulting in the formation of an insoluble salt. Complexation occurs in close vicinity to the surface/sample interface, resulting in the salt being rapidly deposited 9 on the surface as a continuous or segmented thin film.

The above-described process can be used to extract high quantities of metal ions from a fluid solution, and selectively deposit complexes (e.g., salts) of those ions on the treated regions of the substrate. This technique, when used in combination with a sensor, can be used for detection of the presence of these ions, and may be used in combination with radionuclide detectors and ion exchange materials. The method is particularly effective for extracting ions from dilute liquid solutions. Thus, the method may be used to extract ions from the sample, so as to purify the solution, as in waste clean-up.

Figure 2A:
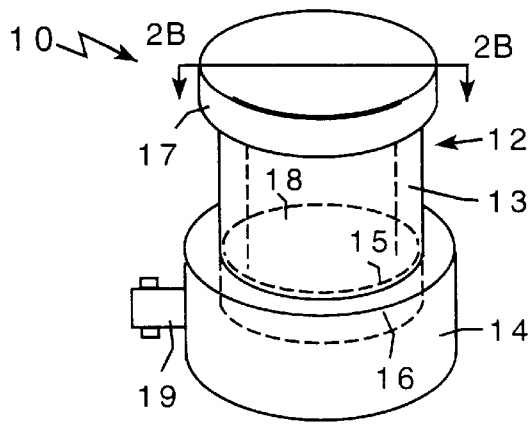
FIGS. 2A and 2B show, respectively, side and cross-sectional views of a chemically treated radionuclide detector according to the invention.
Figure 2B:
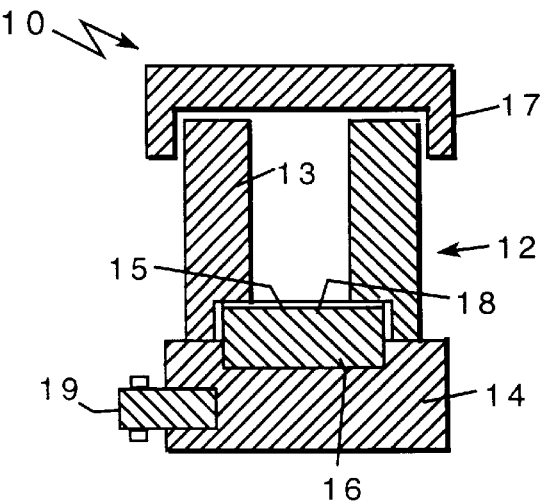
Figure 3:
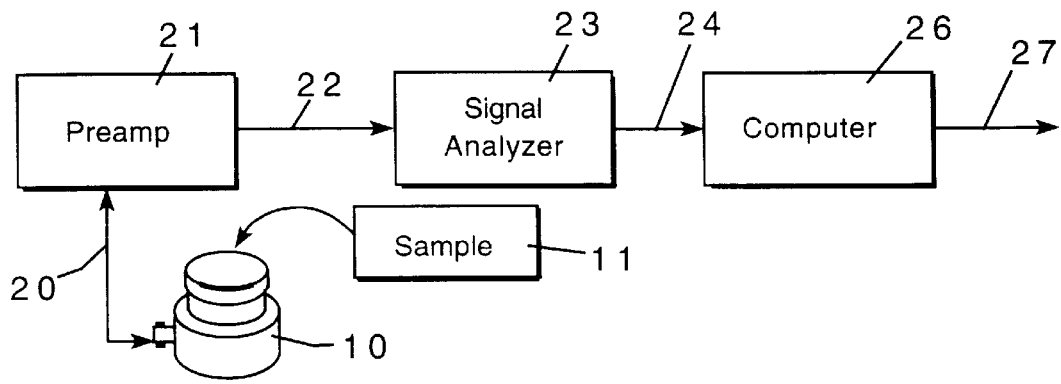
FIG. 3 is a schematic view of the signal processing steps used in combination with the radionuclide detector to analyze the signal from the detector.

With reference to FIGS. 2 and 3, a portable detector 10 having a detecting surface chemically treated according to the invention is used to detect for the presence of radionuclides in a fluid sample. The detector 10 includes a cup portion 12 containing an inert acid and base-resistant container 13 for holding a sample 11 (i.e., a water, gas, or soil sample) during a measurement procedure, and a base portion 14 for housing a semiconductor substrate 15 (e.g., a silicon detector) used to detect the radionuclides. The semiconductor substrate 15 is typically thin (e.g., about 500 microns in thickness) and is often mounted on a secondary substrate 16 (e.g., aluminum) for support. A leak-proof, light-tight cap 17 is used for sealing the sample 11 within the detector.

In order to enhance the sensitivity of the detector 10, thereby allowing, for example, on-site, real-time detection of small amounts of radionuclides, a surface 18 of the semiconductor substrate 15 in direct contact with the sample 11 has been chemically treated to facilitate deposition of the radionuclide(s). This treatment involves exposing the surface 18 to a complexing agent-containing solution, such as phosphoric acid solution, in order to form regions of a complexing agent-based residue (e.g., a residue containing phosphate ions) in contact with the surface 18. Once the sample is delivered to the cup portion, the residue can be hydrolyzed, causing the complexing agent to diffuse away from the surface. Complexation between the phosphate ion and an ionic form of the radionuclide contained in the sample occurs in the vicinity of the substrate surface 18, facilitating a "plating out" or adsorption of the radionuclide onto the surface 18, resulting in the formation of islands or a continuous film of the emitting radionuclide material. Direct contact between the emitting material and the semiconductor surface 18 increases the amount of radionuclide emission absorbed by the semiconductor detector.

Referring to FIG. 3, during operation the sample 11 is introduced to the cup portion 12 of the detector 10, where it is held by the container 13. Once the sample is inserted and the analytes begin plating out on the semiconductor surface, the semiconductor substrate 15 is biased by applying a voltage across the supporting substrate 16 and the semiconductor substrate 15. Emission of either an alpha or beta particle by the radionuclide adsorbed on the biased substrate 15 results in the generation of an electrical signal (i.e., a current output) which is then sent through a connector 19 along the signal line 20. The current output is proportional to the energy of the adsorbed particle.

The signal generated by the detector may first be processed with a preamplifier 21, which preferably includes circuitry having integrating and differentiating time constants to shape the input signal. Following processing by the preamplifier, the shaped signal may be additionally amplified using, e.g., standard high-bandwidth amplifiers. Once amplified to a suitable level, the signal is sent along a line 22 to a signal analyzer 23, such as a multichannel analyzer, where it is registered as a "count" indicating a detected alpha or beta particle. The count is stored in a "bin" corresponding to the energy of the particle. Processing with the signal analyzer 23 results in the generation of an x-y array of points, with the x values corresponding to the energy of the adsorbed particle, and the y values corresponding to the number of counts registered for the particular energy. The x-y array of points is then sent along a signal line 24 to a computer 26 for analysis, resulting in the generation of an additional signal which is sent along a line 27 to, e.g., a process controller.

With reference now to FIGS. 4A–4D, the sensitivity of the radionuclide detector is enhanced prior to delivering the sample 11 to the container 13 by exposing the top surface 18 of the semiconductor substrate 15 to a chemical treatment, resulting in the formation of a thin residue 30 of the enhancing chemical. Chemical treatment preferably involves first washing the surface with a concentrated hydrochloric acid solution to remove any metals or other contaminants which may be adhering to the surface of the detector. This provides a "clean" surface, which is then treated with an aqueous acetone solution containing a complexing agent capable of complexing with the radionuclide. Preferably, the surface is treated with a solution of phosphoric acid ($H_3PO_4$) and acetone for a period of time sufficient to allow the acetone to dry, resulting in the formation of a residue containing the phosphate ion. Alternatively, the surface is treated with an oil or other viscous material capable of suspending the complexing agent. Solutions containing complexing agents capable of forming complexes (e.g., salts) with ionic species containing radionuclides (e.g., $UO_2^{2+}$) are used for the chemical treatment. The solution may be aqueous or non-aqueous, and may contain, for example, combinations of solvents. Preferably, the solvent is volatile to allow rapid drying and formation of the residue. In addition to phosphoric acid, solutions containing the complexing agents may be used to treat the detector surface. Such solution may contain, for example, inorganic or organic phosphates, orthophosphite, phosphinic, phosphorous, phosphinic, hypophosphate, abietate, antimonate, arsenate, borate, butyrate, caprate, acetate, caproate, caprylate, cerotate, chromate, cyanate, ferrocyanide, lignocenate, iodate, napthalenesulfonate, melissate, molybdate, liguocenate, oleate, oxalate phenolate, selenate, propionate, sulfite, titanate, or tungstate ions. Exposure may be accomplished by soaking the detector with the complexing agent containing solution, applying the solution in an aerosolized form, applying an oil or other viscous liquid which contains the solution, or placing a capillary-containing material, such as a polymer, which contains the solution in contact with the detector. In addition, gaseous treatments may be used to chemically enhance the detector. Preferably, an even coat of complexing agent-based residue is formed over the face of the detector. The complexing agent concentration is preferably varied to adjust the sensitivity of the detector. In addition, the solution containing the complexing agent should not degrade the inner walls of the container 13 (indicated in FIGS. 4A–4C by the surface 40), which are preferably composed of teflon, polyvinylidene fluoride (PVDF), glass, or another suitable material. Following its treatment by a complexing agent-containing material, the silicon surface 18 may be rinsed with deionized water to remove any residual acid, and then dried. Heat delivered in the form of hot air, microwave radiation, or other suitable means may be used to accelerate the drying process.

The treatment method can be used to enhance the detection efficiency of commercially available radionuclide detectors. For example, the "Liquid Analyzer System 100", manufactured by Quantrad Sensor (2360 Owen St., Santa Clara, Calif, 95054), may be modified in this fashion. This detection system is described in the Quantrad Sensor Operation Manual (September, 1992; revision 1.1), the contents of which are incorporated herein by reference.

Figure 4A:
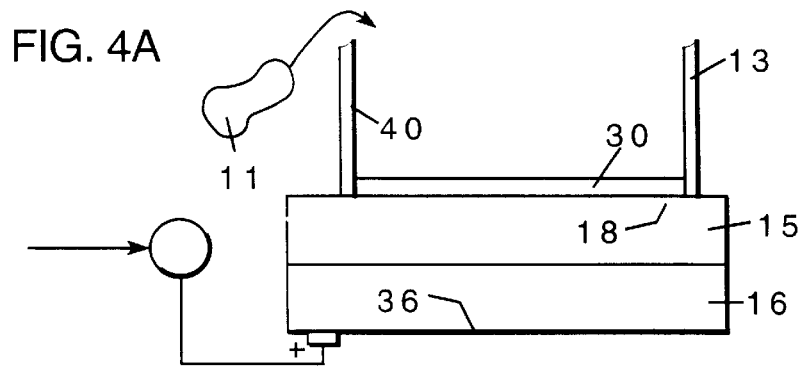
FIGS. 4A–4D show, respectively, side schematic views of the chemically treated semiconductor substrate used in the radionuclide detector prior to contact with the sample, during contact with the sample, after the plating-out process, and during the signal generation process.
Figure 4B:
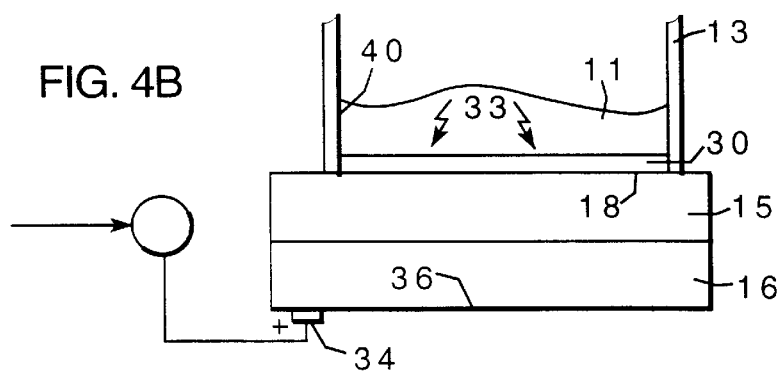
Figure 4C:
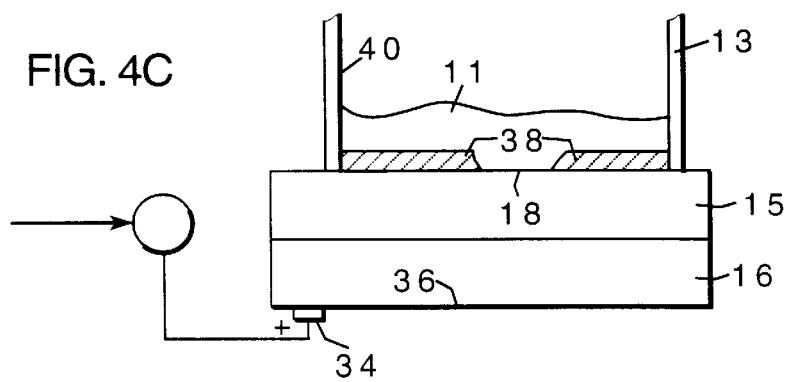
Figure 4D:
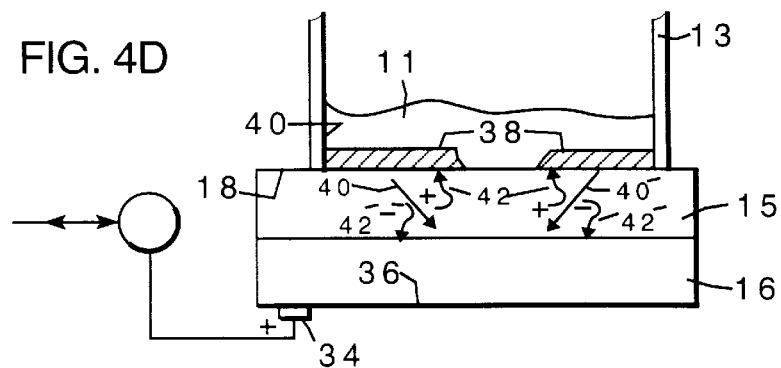

With reference now to FIGS. 4B–4D, during operation of the radionuclide detector, exposure of the treated silicon surface 18 to an aqueous, uranium-containing solution 11 results in diffusion, for example, of uranyl ions (indicated in FIG. 4B by the arrows 33) toward the thin layer 30. In uranium-containing samples, ionic forces drive the complexation between phosphate ions and the uranyl ion; these reactions take place rapidly and in close vicinity to the silicon surface, resulting in the formation of regions 38 of an alpha particle-emitting salt. The salt forms an ultra-thin (typically between 500 and 1000 Å) radiation source which effectively couples emission into the silicon substrate. For example, because alpha (or beta) particles are emitted from the radionuclide isotropically and in all directions, nearly 50% of the emission from the regions 38 will be absorbed by the silicon.

Emission from the regions 38 (indicated in FIG. 4D by the arrows 40, 40') is absorbed throughout the depletion region of the silicon substrate 18, resulting in the generation of charge carriers 42, 42' (i.e., electron-hole pairs) having lifetimes which are long compared to the time required for the charge carriers to drift through the semiconductor substrate 15. For alpha particles, the energy necessary to form an electron-hole pair in silicon is about 3.6 eV per pair; thus, a large number of charge carriers will be generated for each particle. The charge carriers generate a time-dependent electrical signal (typically having a duration of between 1–15 nanoseconds) having an intensity proportional to the energy of the emitted particle; the time dependence of the electrical signal depends on whether the particle is an alpha or beta particle.

For a detector to have high energy resolution, it is necessary to minimize the materials that the emission passes through before reaching the silicon surface. Typically, alpha particles can only travel about 40 microns before being completely absorbed by a surrounding medium (such as water). Thus, when the emitting material is dispersed throughout a liquid sample, particles having the same energy, but emitted in different regions along the surrounding medium, will reach the detector with different energies, decreasing detector resolution and sensitivity. Only those alpha particles originating within the 40 micron layer adjacent to the detector will be counted. This problem is ameliorated in the present invention, where the plating out of the radiation source on the silicon surface minimizes (or eliminates) the path length between the emitting radionuclides and the silicon. This decreases the attenuation of the emission, and necessarily results in a highly resolved detected signal. The high resolution of the detector is especially beneficial when two radionuclides emitting particles of similar energies are present in the sample. The resolution of the detector described herein is typically between about 15–30 keV FWHM for 5 MeV alpha particles.

Radionuclides other than uranium (as the uranyl ion) can be precipitated by various complexing agents onto the surface of the silicon detector. In particular, radionuclides such as thorium, bismuth, polonium, lead, plutonium, and radium have been shown to form water-insoluble complexes with phosphoric acid. Detection of these compounds, therefore, is expected to be enhanced by treating the silicon with phosphoric acid prior to use.

Preferably, the semiconductor substrate which is chemically treated is made from ultra-high purity (i.e., nearly intrinsic) single-crystalline silicon processed using a double-diffusion technique where a heavily doped P layer is diffused into the bottom surface of the silicon, and a lightly doped N layer is diffused onto the top surface. This results in a silicon diode of the p-n or p-i-n structure. Ion-implanted detectors may also be used. The diode is preferably operated under reverse bias (using, e.g., between 25–75 volts for alpha spectroscopy), resulting in the formation of an electric field across the intrinsic region of the silicon. In order to increase its detection efficiency, the exposed silicon has a large surface area, preferably between about 300–5000 mm$^2$. Other types of semiconducting materials, such as GaAs, AlGaAs, germanium and lithium-based materials may also be used as the detector. The silicon thickness is chosen so that emission over a wide range of particle energies can be absorbed in the depletion region; preferably, the silicon has a thickness of between about 100–700 microns.

In general, the amount of ions plated out and the rate that they are plated out on the chemically treated or untreated surfaces can be enhanced by increasing the flow rate between the ion-containing fluid and the surface. Preferably, the flow rate is increased using mechanical stirring or jet-impingement methods. For example, when used alone or in combination with the radionuclide detector, liquid samples pumped under pressure through a jet nozzle can be caused to impinge on the silicon surface at high velocities (typically between 10–20 ft/sec), resulting in an increase in transfer of radionuclides (relative to static solutions) to the silicon surface. Similarly, the mass transfer rate may be increased by mechanically stirring the sample solution inside the detector cup. Both of these mechanisms increase the amount of material plated out and the rate that they are plated out on the chemically treated (or untreated) silicon surface, thereby increasing the amount of emission absorbed by the detector.

Figure 5:
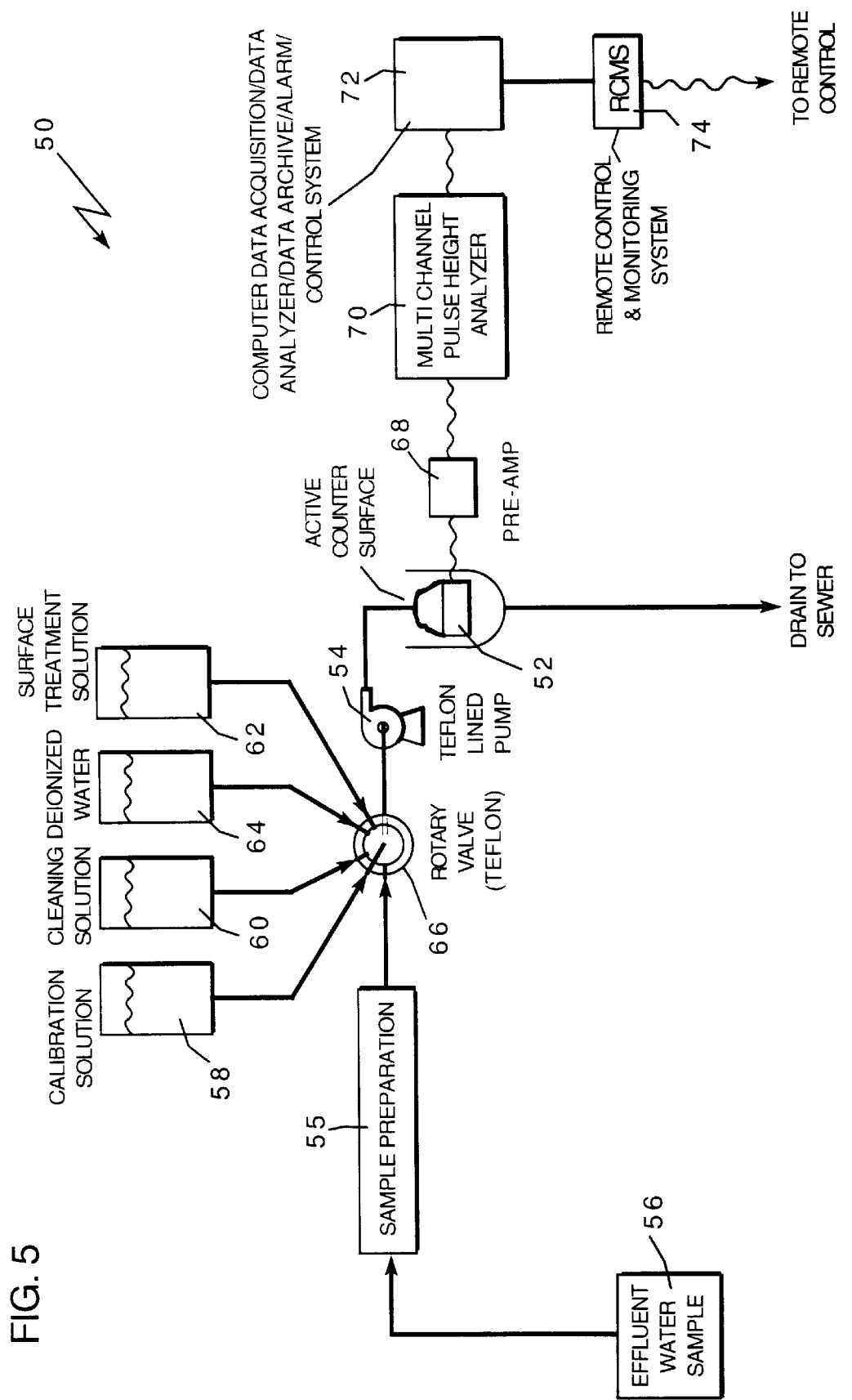
FIG. 5 is a schematic view of the jet-impingement components used with a single radionuclide detector.

With reference now to FIG. 5, a radionuclide detection system 50 using jet impingement to increase the rate of mass transfer between a radionuclide and the surface of the detector 52 includes a teflon-lined pump 54 which delivers a liquid sample 56 (i.e, an effluent water sample) to a jet nozzle with a flow rate of between about 1 and 5 liters/min. Before being pumped, the sample may first be prepared (indicated in the figure by box 55) using, for example, a filter to remove any debris, or an additive which allows the pH to be optimized for adsorption. Once prepared and pumped, the sample flows through the jet nozzle and impinges onto the detector surface to enhance the amount of radionuclide delivered in a sampling period.

In order to monitor gaseous samples, the jet-impingement system may be used in combination with cryogenic equipment. In this case, the gas may be passed through a heat exchanging device in contact with a cryogenic fluid, such as liquid nitrogen, in order to liquify the gas. The liquified gas may then be pumped through a nozzle, cooled below the gas/liquid phase transition temperature, and delivered to the surface of the detector. This allows, for example, uranium levels in air and other gasses to be monitored.

The jet impingement system may be augmented to allow, in addition to the liquid sample 56, calibration 58, cleaning 60, surface treatment 62, and deionized rinse water 64 solutions to impinge the detector surface. This allows for an automated system in which the detector 52 may be calibrated, cleaned, and chemically treated between runs, thereby enabling the liquid sample to be extracted from a source and continuously monitored for a selected period of time. In this case, the appropriate solution is sequentially selected using a teflon rotary valve 66, and then pumped through the nozzle to impinge on the detector surface. After the radionuclides are deposited on the detector surface, emission results in the generation of an electrical signal by the detector 52, which is then preferentially sent to a preamplifier 68 and then processed with a multi-channel pulse-height analyzer 70 to generate an emission spectrum. This spectrum can then be stored and analyzed by a computer 72 to determine the presence of the radionuclides. Once the sample is monitored and the presence of radionuclides is detected, a signal is sent to a remote control and monitoring system 74, and the liquid sample can be discharged back to the source.

Multiple rotary valves and pumps may be included in the jet-impingement system 50 to independently deliver solutions to more than one detector. This allows a first detector to be cleaned and chemically prepared while a second detector is monitoring the flowing sample. After a select time period, the sample flow is switched to the second detector, and the first detector is cleaned and prepared.

Figure 6:
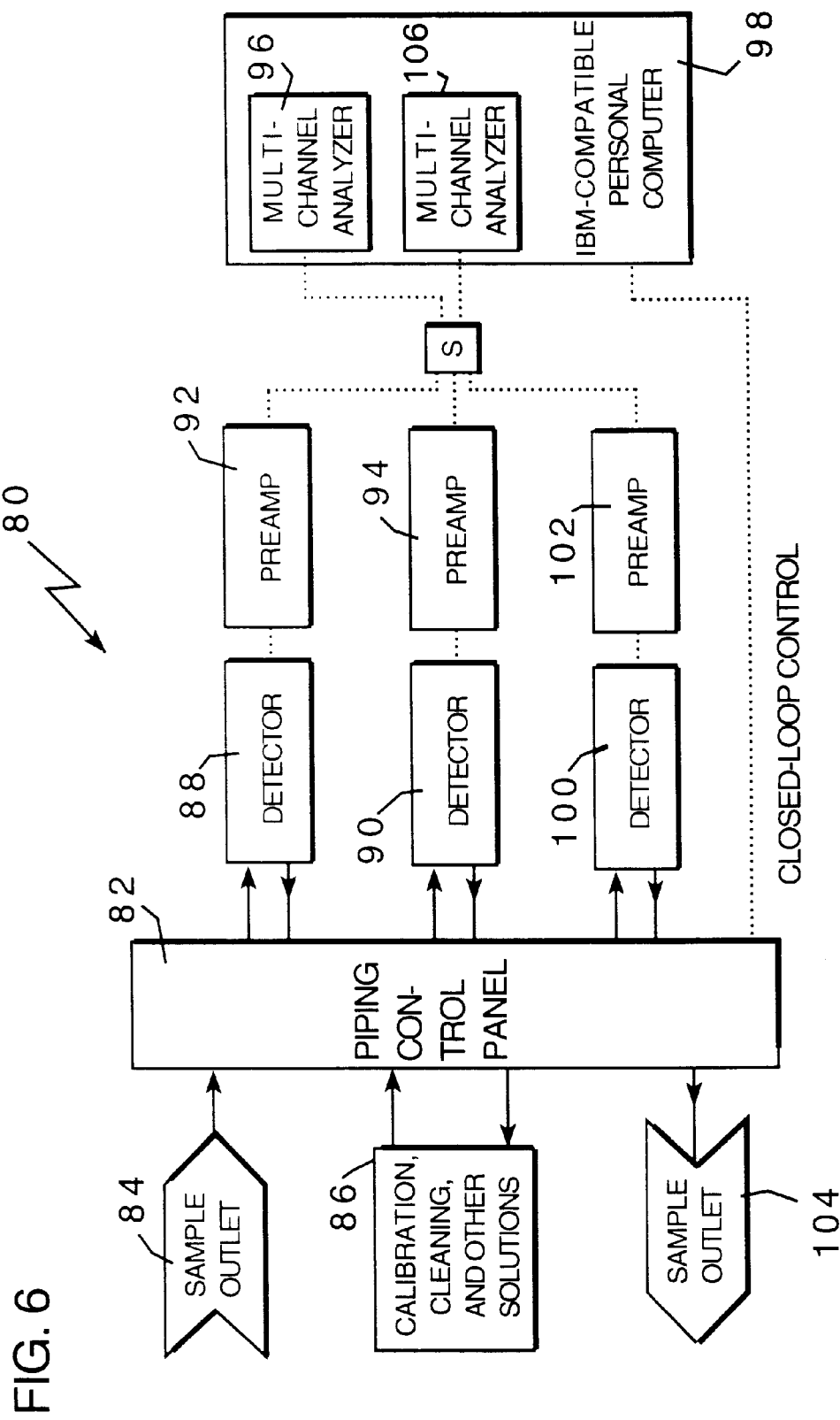
FIG. 6 is a schematic view of the jet-impingement components used in combination with multiple detectors.

With reference now to FIG. 6, a detection system 80 incorporating three detectors includes a piping control panel 82 configured to receive the pumped liquid sample 84, along with the cleaning, calibrating, chemical treating and rinse solutions 86. The sample is pumped to a first chemically treated detector 88 for on-line analysis during a set time period (preferably between 1 and 60 minutes). The sample from the first detector is discharged through a sample outlet 104. During the analysis period, the piping control panel is configured to allow a second detector 90 to undergo chemical cleaning and reactivation in order to prepare it for on-line analysis (the preferred steps of the cleaning/activation cycle, and their associated time periods, are listed in Table 1, below). After the period has expired, the piping control panel 82 delivers the sample to the second detector 90, and the first detector is cleaned and prepared for detection. Both detectors are configured to generate electrical signals in response to radionuclide emission; as before, these signal are amplified (using preamplifiers 92, 94) before being sent to a multi-channel analyzer card 96 contained in a computer 98. The system is configured so that the sample delivery, cleaning and treating, and signal generation processes are continually repeated, allowing the first and second detectors to provide un-interrupted on-line analysis.

In addition, a third detector 100 may be used in combination with a preamplifier 102 and a second multi-channel analyzer 104 to perform periodic automatic calibration and background measurements without affecting the on-line sampling process. This allows verification that each detector is properly calibrated and cleaned, as well as ensuring that very low background levels exist. For example, if one of the detectors 88, 90 is not properly cleaned prior to its analysis period, a high signal level will be generated due to the presence of residual amounts of radionuclide remaining on the detector surface. In this case, comparison of the measured signal level with that generated by the third detector 100 would indicate a erroneously high background signal; the system could then be interrupted in order for the detector to be cleaned. Thus, three detectors used in this manner provide continuous monitoring on liquid samples, even when high levels of radionuclides are present.

TABLE 1

| Preferred Cleaning/Reactivation Cycle | |
|---|---|
| Step | Time Period |
| Soak detector surface in dilute hydrochloric acid to remove plated radionuclide. | 1 minute. |
| Rinse detector surface with deionized water. | 1 minute. |
| Allow detector surface to dry. | 1 minute. |
| Expose detector surface with phosphoric acid solution. | 1 minute. |

TABLE 1-continued

Preferred Cleaning/Reactivation Cycle

| Step | Time Period |
|---|---|
| Allow detector surface to dry. | 1 minute. |

In addition to using the jet-impingement method, an increase in the rate of transfer of the radionuclide to the detector's surface can be accomplished through rapid stirring of the solution contained within the detector cup. This allows fresh portions of the sample to continually move from the bulk of the sample to the periphery of the detector cup, thereby maximizing the possibility that the radionuclides will be adsorbed onto the detector's surface. In general, in order to minimize the potential for generating electromagnetic interference (EMI) which may adversely affect the level of the detected signal, the rapid stirring is preferably accomplished with air-driven motors, as opposed to electric motors. Stirring is preferably accomplished with a stirring impeller, such as a two-bladed radial-flow design impeller mounted on a rotating shaft.

Figure 7:
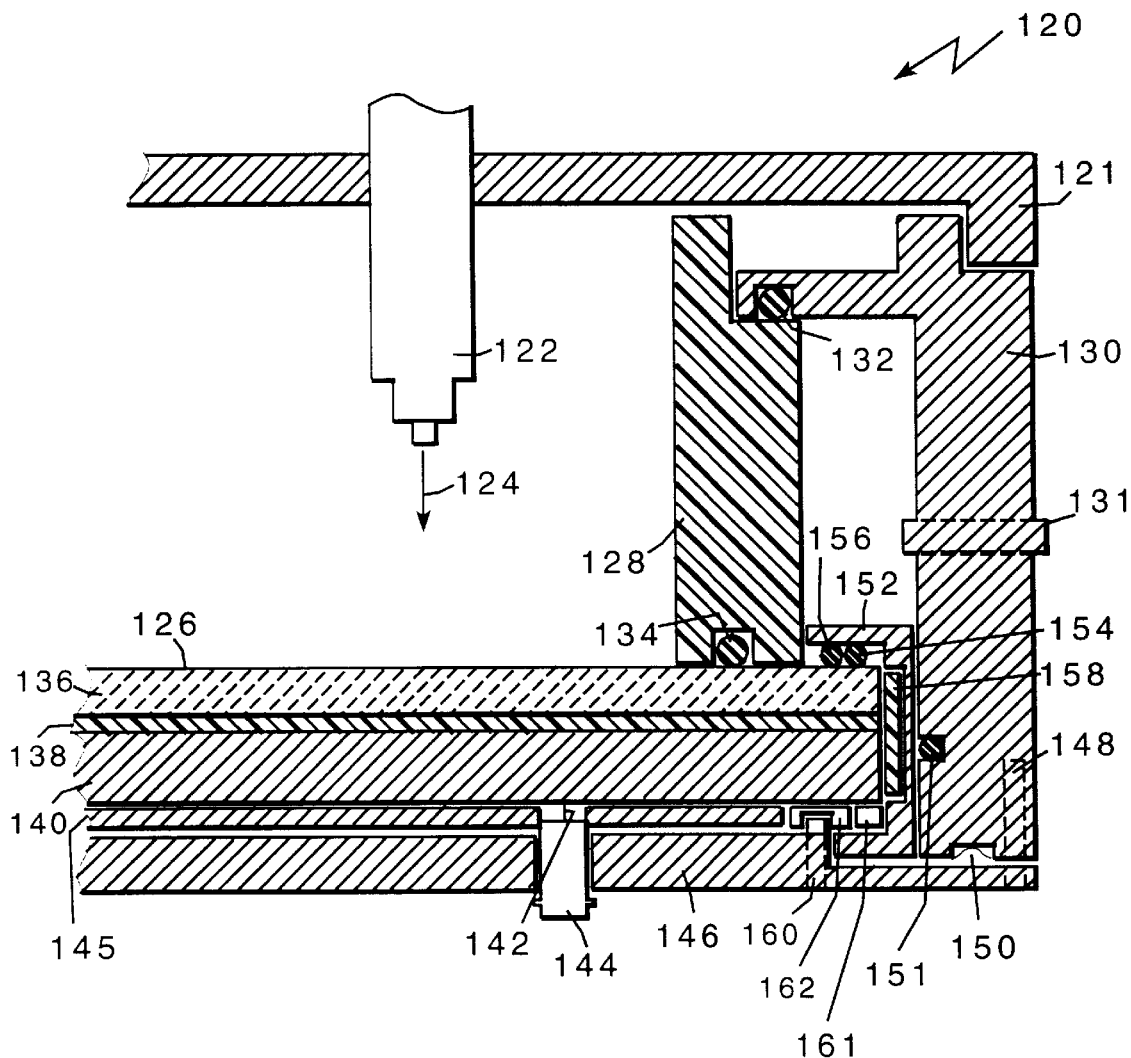
FIG. 7 is a cross-sectional view of a detector cup assembly used to hold a sample in the radionuclide detector.

FIG. 7 shows a substantially leak-proof detector cup assembly 120, which is of particular importance when stirring or jet impingement is used to enhance the rate of mass transfer onto the detector surface. In the assembly 120, a non-adhesive mechanism is used to form the leak-tight seal; all sealing is done by applying a force on the top and bottom portions on the assembly walls. In particular, the assembly 120 used to measure liquids containing radionuclides includes a cap 121 which supports a nozzle 122 used for delivering a liquid sample onto the detector surface 126. The flow of the liquid is indicated in the figure by the arrow 124. In general, the cup assembly provides primary and secondary sealing to prevent leaks, and is configured so that mismatches in thermal expansion of the various components can be accounted for, allowing for a leak-proof seal over a broad range of temperatures.

The interior lining 128 of the cup assembly 120 is preferably composed of a acid and base-resistant polymeric material, such as teflon or PVDF, and is sealed against the top portion of a metal housing 130 (preferably composed of stainless steel) using an o-ring 132, which can be made of teflon, teflon-coated silicon rubber or viton rubber. Using a second o-ring 134, the bottom portion of the lining 128 is compressed against the top surface 126 of the silicon detector 136, which, in turn, is in contact with a layer of conductive rubber 138 deposited on a metal substrate 140 in electrical contact via an electrical lead 142 with a connector 144 (such as a BNC connector) supported by a housing 145.

A bottom plate 146 of the leak-proof assembly is attached to the metal housing 130 using a bolt assembly 148, and a wave spring 150 is seated in a groove extending circularly along the bottom surface of the metal housing 130. A vacuum port 131 in the housing 130 allows the assembly to be evacuated or pressurized, if necessary. The housing 145 in contact with the bottom plate 146 is sealed against the surface 126 of the silicon detector 136 using a conductive o-ring 154 and a viton (or teflon) o-ring 156 providing a secondary seal. The housing 145 is separated from the metal substrate 140, conductive rubber layer 138, and the silicon detector 136 using an electrically insulating ring 158. An additional o-ring 159 is used to seal the housing 145 against the side of the metal housing 130. In order to provide the leak-proof seal, an adjustable compressional force is applied using a bolt 160 in contact with an insulating washer 162. When screwed into the bottom plate 146, the bolt 160 allows the lining 128 to be compressed between the silicon detector 136 and the top portion of the metal housing 130, thus sealing it from leaks.

In the above described method and apparatus, radionuclides are collected from solution onto the detector surface, to which a complexing agent has previously been applied to enhance the collecting ability. The detector can detect the radionuclides while they are being collected on the detector. The invention also provides a method and apparatus of collecting inorganic analytes, such as radionuclides, from a solution or other liquid sample and detecting the analytes, in which the collecting and detecting steps are carried out separately. In this embodiment, a solid phase extraction (SPE) technique using an ion exchange material is used to collect the sample on the substrate. All metal species, both anionic and cationic in nature, can be recovered with an appropriate mix of cation and anion exchange materials.

Figure 11:
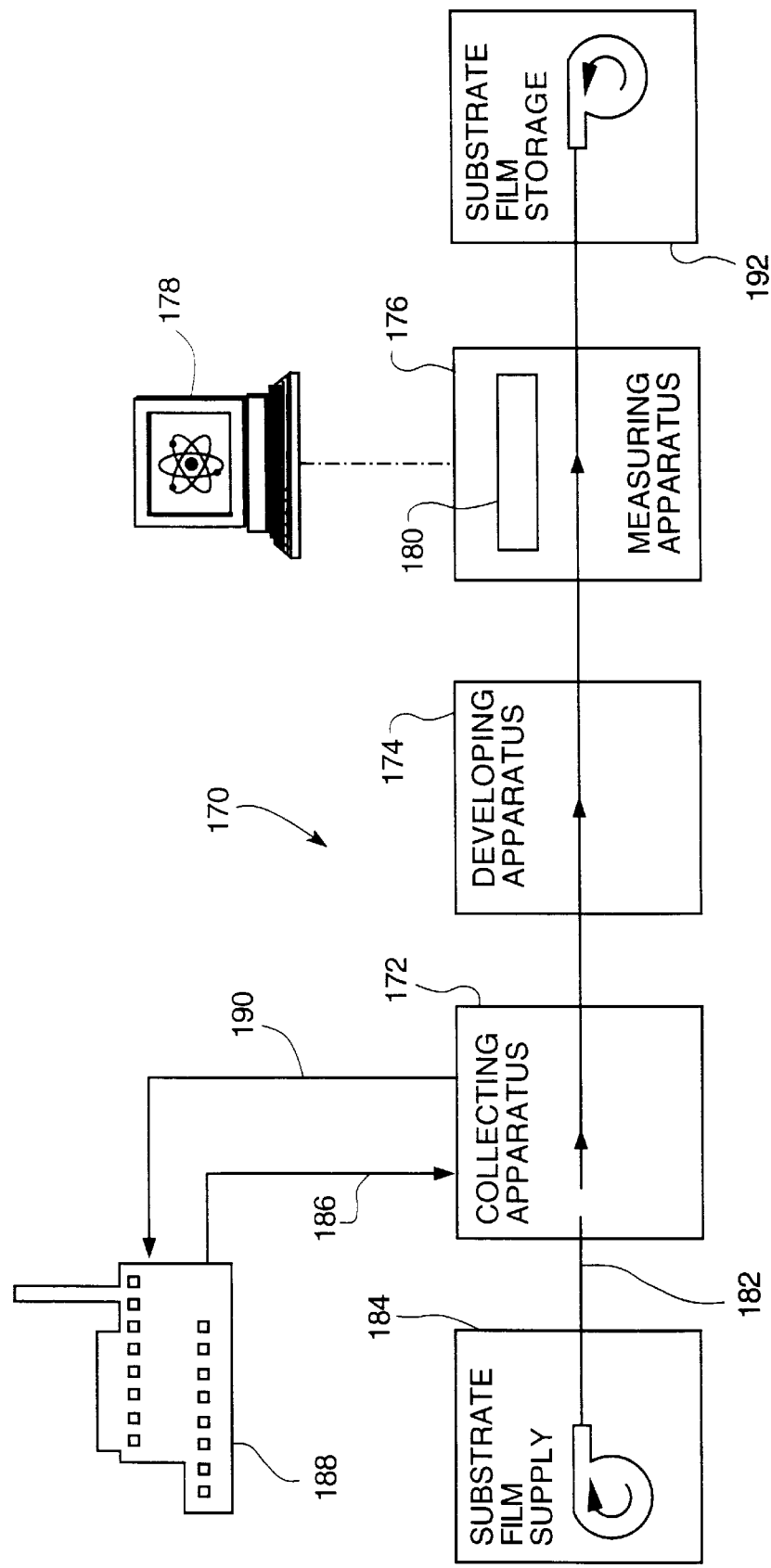
FIG. 11 is a block diagram of a radionuclide detecting apparatus according to the invention.

According to this aspect of the invention, up to 100% of one or more radionuclides, or other metallic analyte, can be collected from a sample solution using the SPE technique. With reference now to FIG. 11, a fluid monitoring system 170 adapted for monitoring low levels of dissolved radionuclides in a fluid sample includes a collecting apparatus 172, a developing apparatus 174, and a measuring apparatus 176. Processing electronics 178 is coupled to measuring apparatus 176 for analyzing signals from a solid state detector 180 in measuring apparatus 176.

A film substrate 182, which includes an ion exchange resin carried on a support medium, is fed from a substrate film supply 184 into collecting apparatus 172. Alternatively substrate 182 can be configured as an individual disc, and moved mechanically or manually between collecting apparatus 172, developing apparatus 174 and measuring apparatus 176. A section of substrate 182 is exposed in collecting apparatus 172 to a measured quantity of a sample solution containing the radionuclides. The sample solution comes through a supply line 186 from a source 188, which may be a power plant discharge, a factory discharge, a drinking water supply, a well from a contaminated or uncontaminated site, a sewage line, or the like. There may be a drain or a return line 190 to source 188. The radionuclide is collected on the exposed section of substrate 182 by the ion exchange resin. After collecting, substrate 182 is transported to developing apparatus 174 and positioned such that the exposed section of substrate 182 can be prepared for measuring radionuclide emissions, for example, by drying. The exposed section of substrate 182, now dried, is then transported to measuring apparatus 176, where solid state detector 180, being positioned in close proximity to substrate 182, is employed to detect emissions from the collected radionuclide on the exposed section of substrate 182. After measuring the emissions, the measured section of substrate 182 is transported to a substrate film storage 192, where the exposed sections of substrate 182 can be archived. These stored sections of substrate 182 can be retrieved and remeasured at a later date.

Signals indicative of the emissions are analyzed by processing electronics 178. Processing electronics 178, which are well known in the art of radionuclide detection and measurement systems and may include a processor, can determine a total activity level of the fluid sample based upon the measured amount of the fluid sample and a measured emission rate from substrate 182. Processing electronics 178 can provide a spectrum of the measured emissions and identify a species of one or more radionuclides in the sample fluid based on the spectrum. Processing electronics 178 can also determine a concentration of the identified species based on the measured amount of fluid sample and the spectrum.

Figure 12A:
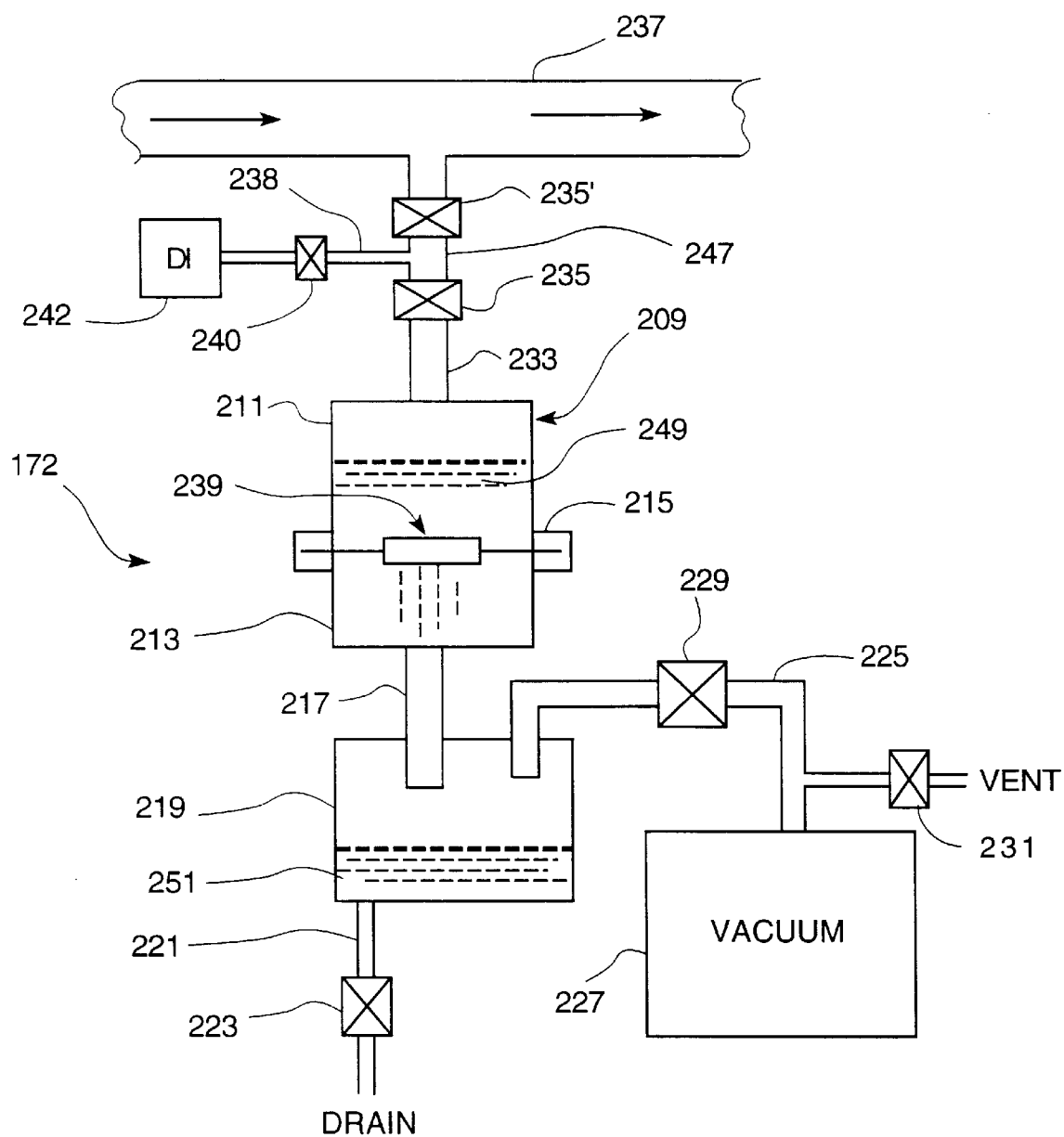
FIG. 12A is a schematic of a collecting apparatus.

Referring now also to FIG. 12A, collecting apparatus 172 for collecting a radionuclide from a sample fluid includes a wet collecting chamber 209. Collecting chamber 209 has separable top and bottom portions 211, 213, respectively, joined at a flanged coupling 215. An outlet pipe 217 drains fluid from bottom portion 213 into the top of a sealed chamber 219. A drain pipe 221 at the bottom of chamber 219 includes a shut-off valve 223. A vacuum line 225 couples a source of vacuum 227 to the upper part of chamber 219. Vacuum line 225 includes a shut-off valve 229 and a valve 231 to vent. Alternatively, outlet pipe 217 can be coupled directly to a positive displacement pump (not shown), such as, for example, a peristaltic pump, a tubing pump or the like. Top portion 211 of collecting chamber 209 is coupled by an inlet pipe 233, which includes a shut-off valves 235, 235' to a sample fluid source 237. Source 237 may be a pipe carrying process fluids, effluent water, drinking water, water from monitoring wells near a waste site or hazardous material storage site, or the like. Collecting apparatus 207 also includes a fluid line 238 having a shut-off valve 240 connecting to a source of deionized water (DI) 242 arranged for rinsing collecting chamber 209.

Figure 13A:
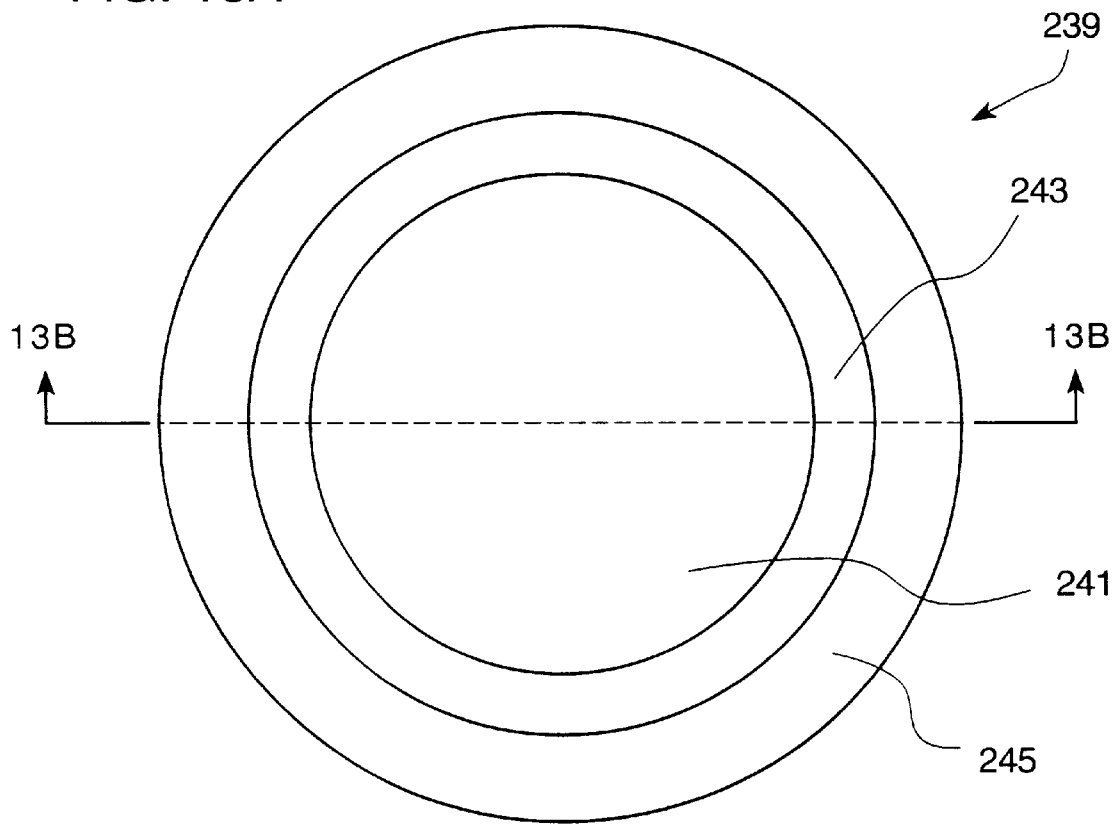
FIG. 13A is a plan view of a substrate according to one feature of the invention.
Figure 13B:
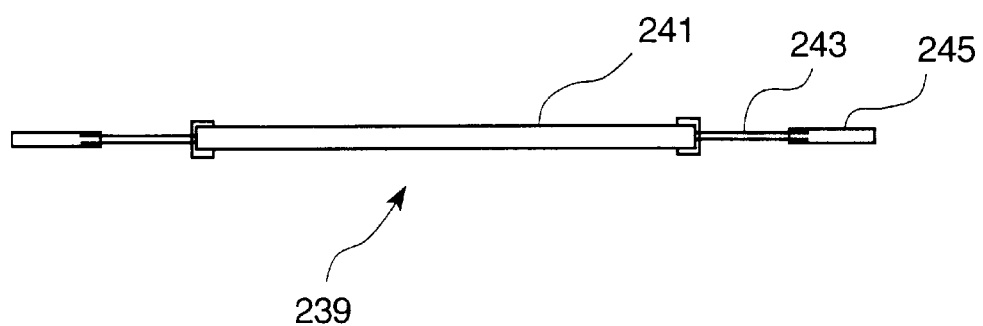
FIG. 13B is a sectional view through line 13B—13B of FIG. 13A.

A substrate 239 for collecting analytes from the sample fluid is positioned within collecting chamber 209. Referring now also to FIGS. 13A and 13B, substrate 239 is configured to include a porous SPE disc 241 that includes an ion exchange resin. Porous disc 241 is held by a thin, non-porous plastic centering ring 243. Centering ring 243 is held by a stiffening border 245 that can be made from a more rigid material, such as cardboard, hard plastic, polycarbonate, or other suitable material. Border 245 can serve as a gasket between top and bottom portions 211, 213 of collecting chamber 209. Centering ring 243 provides a barrier inhibiting sample fluid in a region above article 239 from passing around disc 241. Border 245 and centering ring 243 can be configured as square members, rather than the round members depicted in FIG. 13A.

Porous SPE disc 241 may be formed of a fibrous material, such as 10% by weight expanded PTFE, and have approximately 1 μm size passageways. The ion exchange material can include particles having a nominal size of approximately 9 μm. SPE discs are manufactured with anion exchanger and cation exchanger chemistries and sold under the trade name Empore™ by Minnesota Mining and Manufacturing Co. of Minneapolis, Minn. Ansys, Inc., of Irvine, Calif., also provides SPEC® discs with four different chemistries, including an anion exchanger, a cation exchanger, a C-8 octyl-bonded phase, and a C-18 AR acid resistant octadecyl-bonded phase. Sartorius coprporation, of Edgewood, N.Y., supplies SARTOBIND™ discs with a variety of chemistries. The C-8 and C-18 chemistries can be used to sorb nonmetalic analytes, such as, for example, organic compounds.

Collecting apparatus 172 operates in the following manner. A measured amount of sample fluid 249 being held in a section 247 of pipe 233 between valves 235, 235' is allowed into collecting chamber 209 by opening valve 235 while keeping valve 235' closed. Sample fluid 249 is held above substrate 239 in an upper portion of collecting chamber 209 by disc 241 and centering ring 243. With drain valve 223 and vent valve 231 closed, valve 229 to vacuum source 227 is opened, creating a partial vacuum in the region 213 of chamber 209 below substrate 239. The vacuum draws sample fluid 249 through disc 241. Spent sample fluid 251 collects in chamber 219, which can also be adapted for measuring the volume of sample fluid. If a displacement pump is used instead of vacuum pump 227 and chamber 219, the displacement pump provides a sufficiently reduced pressure in bottom portion 213 of chamber 209 to draw sample 249 through substrate 239. Thus, virtually all sample fluid 249 passes through disc 241, where radionuclides in solution can be collected by the ion exchange resin. This method can recover up to 100% of many compounds from a one liter sample on a single 90 mm disc in about 8–12 minutes.

Figure 12B:
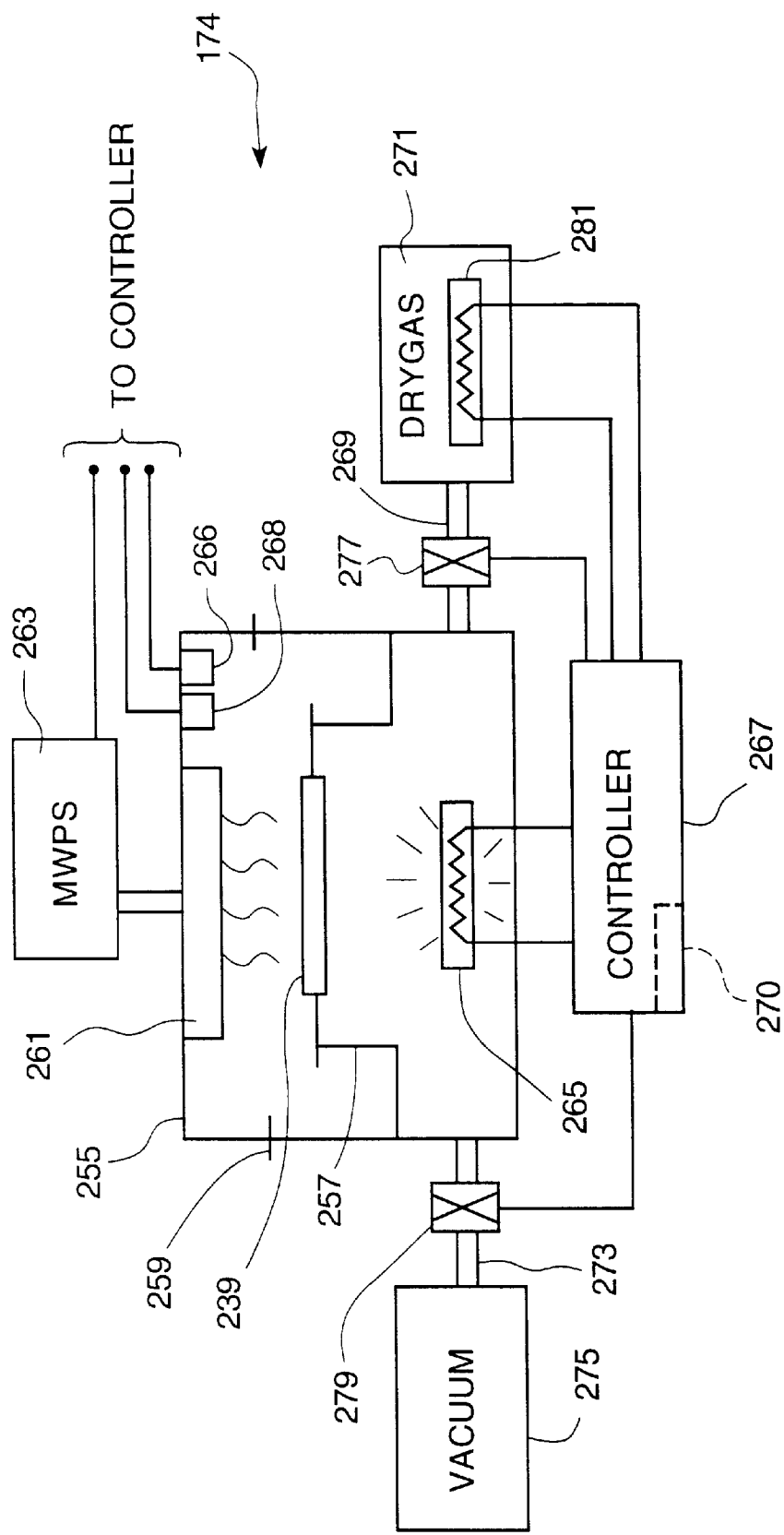
FIG. 12B is a schematic of a drying apparatus.

After all of the measured amount of sample fluid 249 has been drawn through disc 241, substrate is removed from collecting chamber 209 and prepared for detecting the radionuclides by drying in a drying chamber. Referring now also to FIG. 12B, developing apparatus 174 includes a drying chamber 255 having a support structure 257 for supporting substrate 239 therein with minimal contact. Drying chamber 255 can be opened and closed at a seal 259, which may be provided by a flanged coupling and an o-ring. To dry substrate 239 after it is removed from collecting apparatus 176, drying apparatus 174 can include one or more drying systems. Drying systems can include a microwave source 261 and power supply (MWPS) 263, a radiative heating element 265 within drying chamber 255, a gas connection 269 to a source of dry gas 271, and a vacuum connection 273 to a source of vacuum 275. Valves 277 and 279 are provided on gas connection 269 and vacuum connection 273, respectively. The dry gas may be heated by a gas heating element 281. A dryer controller 267 can be coupled to MWPS 263, heating elements 265 and 281, and actuators on valves 277 and 279 for automated processing based upon signals from one or more of a temperature sensor 266, a humidity sensor 268, and a timer 270.

Figure 12C:
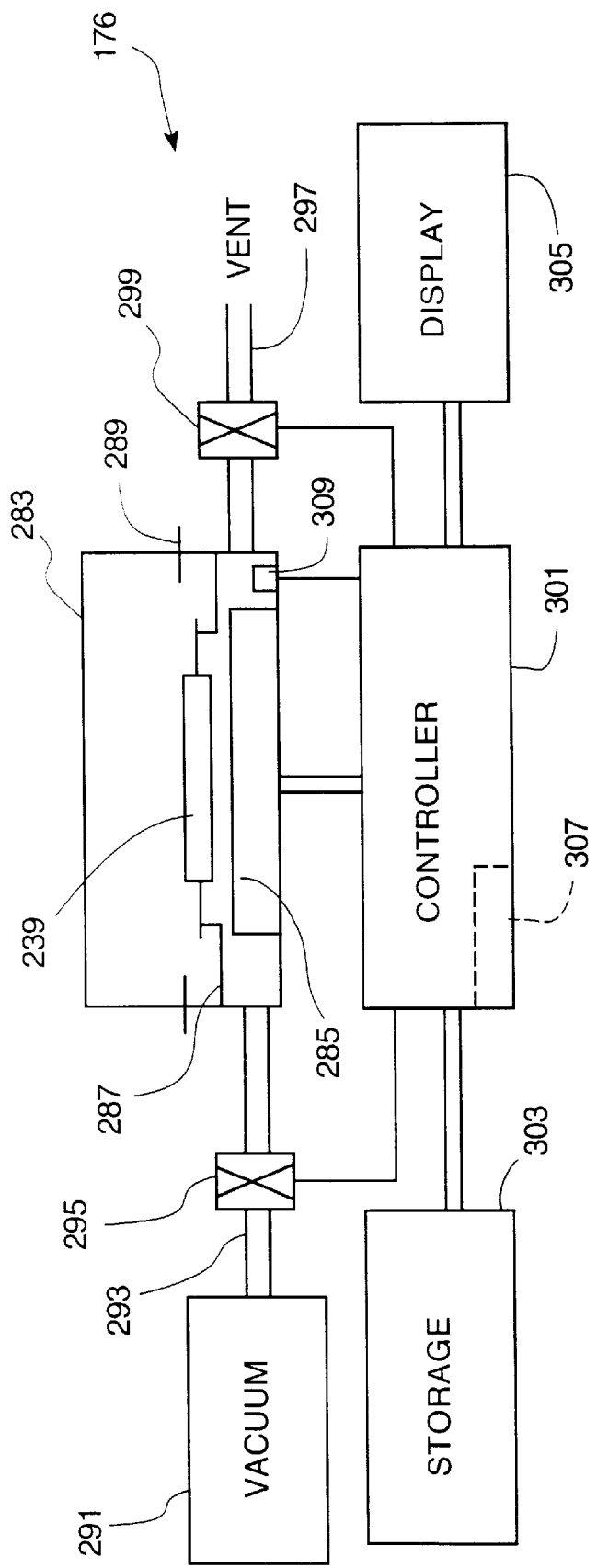
FIG. 12C is a schematic of a measuring apparatus.

After substrate 239 is dried, drying chamber 255 is opened to move substrate 239 to measuring apparatus 178. Referring now also to FIG. 12C, measuring apparatus 176 includes a measuring chamber 283 having solid state detector 180 therein. Substrate 239 is positioned within measuring chamber 283 in close proximity to detector 180 by a support structure 287. Support structure 287 positions substrate 239 such that what was the upstream surface of disc 241 in collecting chamber 209 is facing detector 180. Measuring chamber 283 is light-tight, and has a vacuum seal 289, which can be provided by an o-ring and a flanged coupling, to allow measuring chamber 283 to be opened for inserting and removing substrate 239. Measuring apparatus 176 also includes a source of vacuum 291 coupled to measuring chamber 283 by a vacuum line 293 with a valve 295, and a vent line 297 also having a valve 299. Valves 295 and 299 may be actuated valves configured for electronic control.

Detector 180, which can be an alpha detector as described above, a beta detector, or an x-ray or gamma detector, is coupled to a detector power supply/process controller 301. Controller 301 is coupled to a media for data storage 303 and a display 305, and can be configured to include a preamp, a multi-channel signal analyzer and a computer as described above with reference to FIG. 3. Controller may also include controls for controlling operation of valves 295 and 299. A timing circuit 307 and a control circuit in controller 301 can be responsive to signals from a pressure sensor 309 within measuring chamber 283 for automating valve operations and data collecting.

To detect the collected radionuclides, substrate 239 is positioned on support 287 within measuring chamber 283 as close as practicable to an exposed detecting surface of detector 180. Measuring chamber 283 then is closed and sealed. With vent valve 299 closed and vacuum valve 295 opened, measuring chamber 283 is evacuated to a vacuum of about 29.5 inches of Hg. Controller 301 applies an appropriate detecting voltage to detector 180, and emissions from radionuclides that were collected on substrate 239 are detected in a known manner.

Detector 180 and controller 301 may be configured to provide spectra for identification purposes, or to provide a total activity level. Information about the quantity of sample fluid 249 is used to determine concentration levels in the sample fluid. One or more scaling factors may also be applied in the data analysis. Scaling factors can include factors related to the substrate's efficiency in collecting different analyte species, related to the detector efficiency in detecting emissions having different energies, related to the thickness of a layer of substrate 239 in which radionuclides are collected, and other factors. Computer algorithms for such scaling operations are known in the measuring art.

More than one detector can be used in sequence or simultaneously. Non-radioactive analytes can be detected by other techniques, such as, for example, laser-induced fluorescence, x-ray fluorescence, infrared spectrum analysis or Raman analysis. Organic analytes can be collected with other types of corbent materials, such as C-8 and C-18.

The anion and cation SPE discs can be used for rapid ion exchange retrieval of up to 100% of the uranium and other radionuclides from an aqueous solution. The recovered radionuclides can be counted directly on the discs using measuring apparatus 176 with an alpha monitor as described above, or appropriately eluted from the discs and analyzed by other techniques. For reference, one liter of water containing uranium at proposed EPA drinking water limit emits 30 alpha particles per minute, which would provide sufficient activity for isotopic analysis in a three minute count time.

Figure 14:
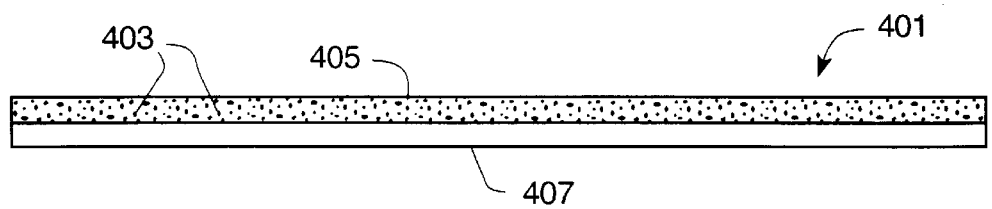
FIG. 14 is a sectional view of a substrate different from that shown in FIGS. 13A and 13B.

Ion exchange resins can be formed onto other geometries to be used in measuring apparatus 176, for example, with the alpha monitor detector 180 described above. Referring now to FIG. 14, a continuous de-ionization (CDI) membrane 401, which is formed by U.S. Filters/Ion Pure from a 50:50 mix of polyethylene and finely ground ion exchange resin 403 extruded into a thin film 405 on a support media 407.

This type of surface having ion exchange resin exhibited a 20-fold increase in uranium uptake rate relative to a phosphoric acid treated detector as described above. However, CDI membrane 401 may have a rough surface. This can make accurate isotopic analysis more difficult because the rough structured surface approximates a thick source. Cation and anion CDI membrane samples can recover uranium from aqueous samples about equally well. In fact, the anion sample has twice the total capacity for uranium as does the cation sample. This is surprising because uranium is supposed to be in the cationic form ($UO_2^{+2}$) in solution, and should not be recovered by the anion membrane in any significant quantities.

Figure 15:
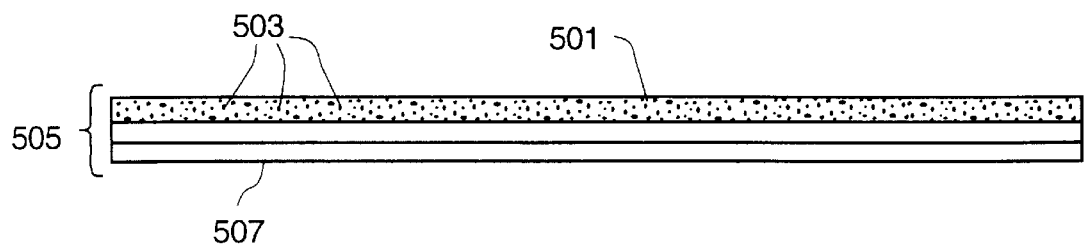
FIG. 15 is a sectional view of yet another embodiment of a substrate.

Referring now to FIG. 15, in yet another embodiment, a lacquer 501 containing a finely divided ion exchange material 503 was applied to one side of a reverse osmosis (RO) membrane 505 having a fabric backing 507 on its other side. Membrane is about 0.005 inches thick, and is cutfrom a larger size sheet formed on a web. This type of RO membrane is available from U.S. Filter Co.

To collect radionuclides from a solution, RO membrane 505 is soaked in a known volume of the solution for a predetermined period of time. 0.64% of the uranium from a 50 cc sample having 9.8 ppm uranium can be collected with a 1.0 $cm^2$ diameter membrane with a ten minute soak. The rate of collection can be enhanced by moving or flowing the sample over the membrane, for example, by stirring the sample or by directing a flow of sample at or across RO membrane 505 using jet impingement.

Uranium uptake appears to be faster using RO membranes than with CDI membranes. For example, a 5 minute soak in 9.8 ppm uranium solution with an RO material provided a larger count rate than did a 20 minute soak with a CDI membrane. RO membranes are also smoother than CDI membranes. This permits them to be used for isotopic analysis.

Figure 16:
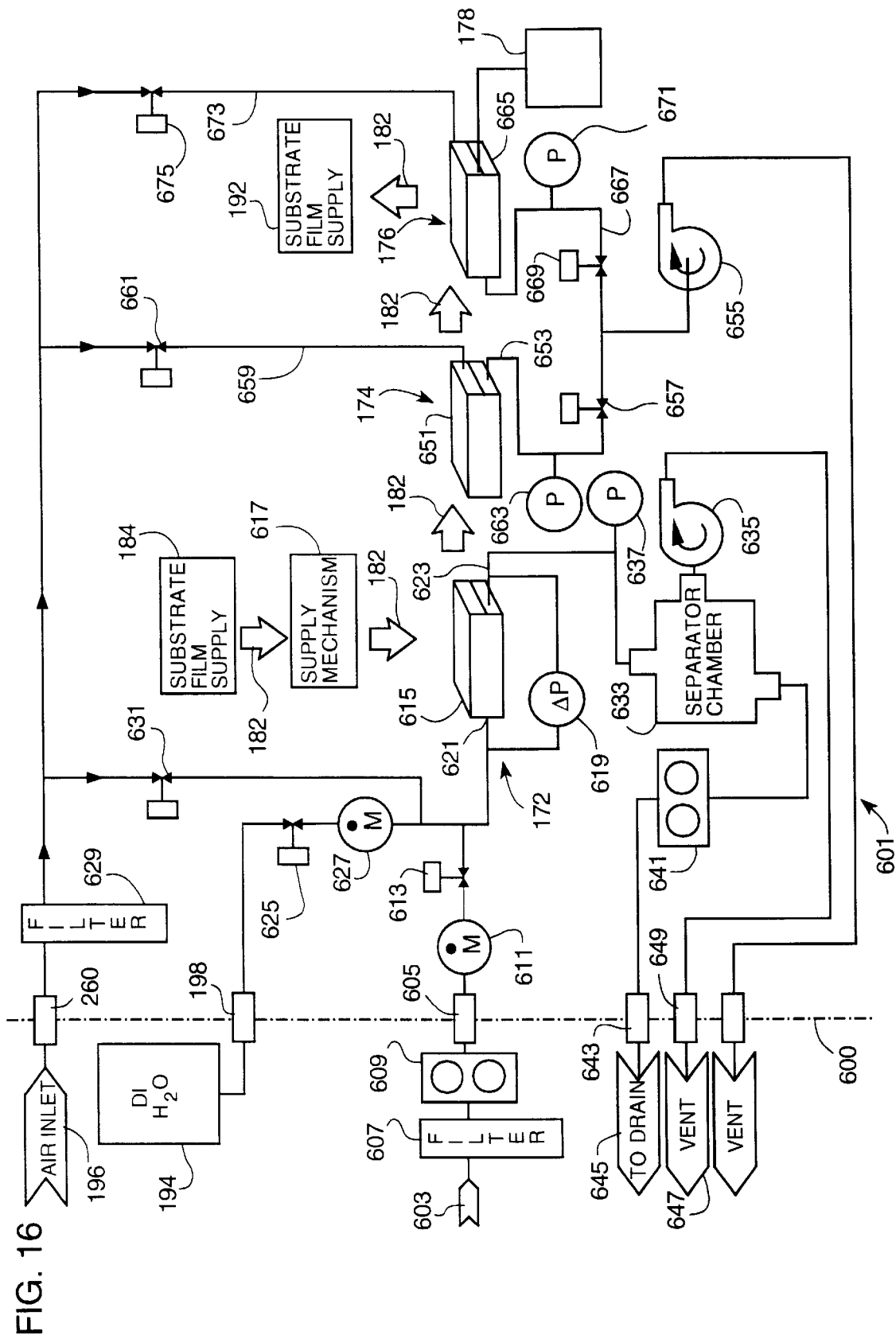
FIG. 16 is a functional schematic diagram of a embodiment of a collecting and detecting apparatus.

Referring now to FIG. 16, a system 601 for collecting and detecting radionuclides or other inorganic or organic analytes can be configured as a unified, automated system for use with a plurality of disk substrates 182. System 601, which is housed in a cabinet 600, is coupled to a source 603 of sample fluid via a coupling 605. Sediments are filtered out of the sample fluid by a filter 607, and the fluid is pumped into system 601 with a pump 609. A mass flow meter 611 provides a measured amount of sample fluid to system 601, and a solenoid valve 613 controls the flow of sample fluid to collecting apparatus 172. Also coupled to system 601 is a DI water supply 194 and an air inlet 196, via couplings 198 and 200, respectively.

Collecting apparatus 172 includes a collecting chamber 615 that is configured to allow each disk substrate 182 to be transported through collecting chamber 615 while maintaining a fluid-tight seal while a section of the substrate 182 is being exposed to the measured amount of sample fluid. A supply mechanism 617 provides substrates 182 from substrate film supply 184. Film substrate 182 can be an SPE film, or a CDI or RO membrane that incorporates an ion exchange resin as described above, or other suitable material. In the described embodiment, substrate 182 is approximately the same diameter as a compact disk (CD). A differential pressure gauge 619 is configured to measure the differential pressure between a fluid inlet 621 and outlet 623 of collecting chamber 615.

Deionized (DI) water from DI water supply 194 is used to rinse collecting chamber 615 and associated plumbing lines. DI water supply 194 is coupled to collecting chamber 615 through inlet 621 via a solenoid valve 625 and a mass flow meter 627. Air from air inlet 196 is also coupled to collecting chamber 615 for drying collecting chamber 615 and associated plumbing lines. Air is filtered for dust by filter 629 and air flow is controlled by solenoid valve 631. A wetting solution (not shown) may also be coupled to collecting chamber 615 by appropriate means.

Collecting chamber outlet 623 is connected to a separator chamber 633 configured similarly to chamber 219 illustrated in FIG. 12A. Vacuum generated by a vacuum pump 635 helps to draw sample fluid through collecting chamber 615, and, if a substrate 182 is a porous substrate, to draw the fluid sample through substrate 182. A pressure gauge 637 monitors the vacuum pressure, and a pump 641 pumps the spent sample fluid out through coupling 643 to a drain 645. Vacuum pump 635 is exhausted to vent 647 through coupling 649. Alternatively, separator chamber 633 and vacuum pump 635 can be replaced by a fluid pump, such as a peristaltic pump (not shown).

Collecting chamber 615 can be configured with a stirring mechanism (not shown) for stirring the fluid sample and/or a jet mechanism (not shown) for directing a jet of fluid sample on the surface of substrate 182 to increase a flow of fluid sample on substrate 182 and thereby increase the rate of collecting radionuclides from the fluid sample.

After radionuclides or other analytes are collected on a section of substrate 182 in collecting chamber 172, the exposed section of substrate 182 is transported to developing apparatus 174, which includes a drying chamber 651 adapted for heating and drying substrate 182. Drying apparatus 174 includes a heat source (not shown), a vacuum line 653 coupled to a vacuum pump 655 via a solenoid valve 657, and an air line 659 coupled to air inlet 196 vial valve 661. A pressure gauge 663 monitors pressure in drying chamber 651.

Measuring apparatus 176 includes a measuring chamber 665 having a solid state detector (not shown). Measuring chamber 665 is coupled to vacuum pump 655 via vacuum line 667. Line 667 includes a valve 669 and a pressure gauge 671. Measuring chamber 665 is also coupled to air inlet 196 via line 673, the air supply being controlled with valve 675. Processing electronics 178 are coupled to the detector to detect emissions from radionuclides, or other analyte, collected on the substrate.

Figure 17:
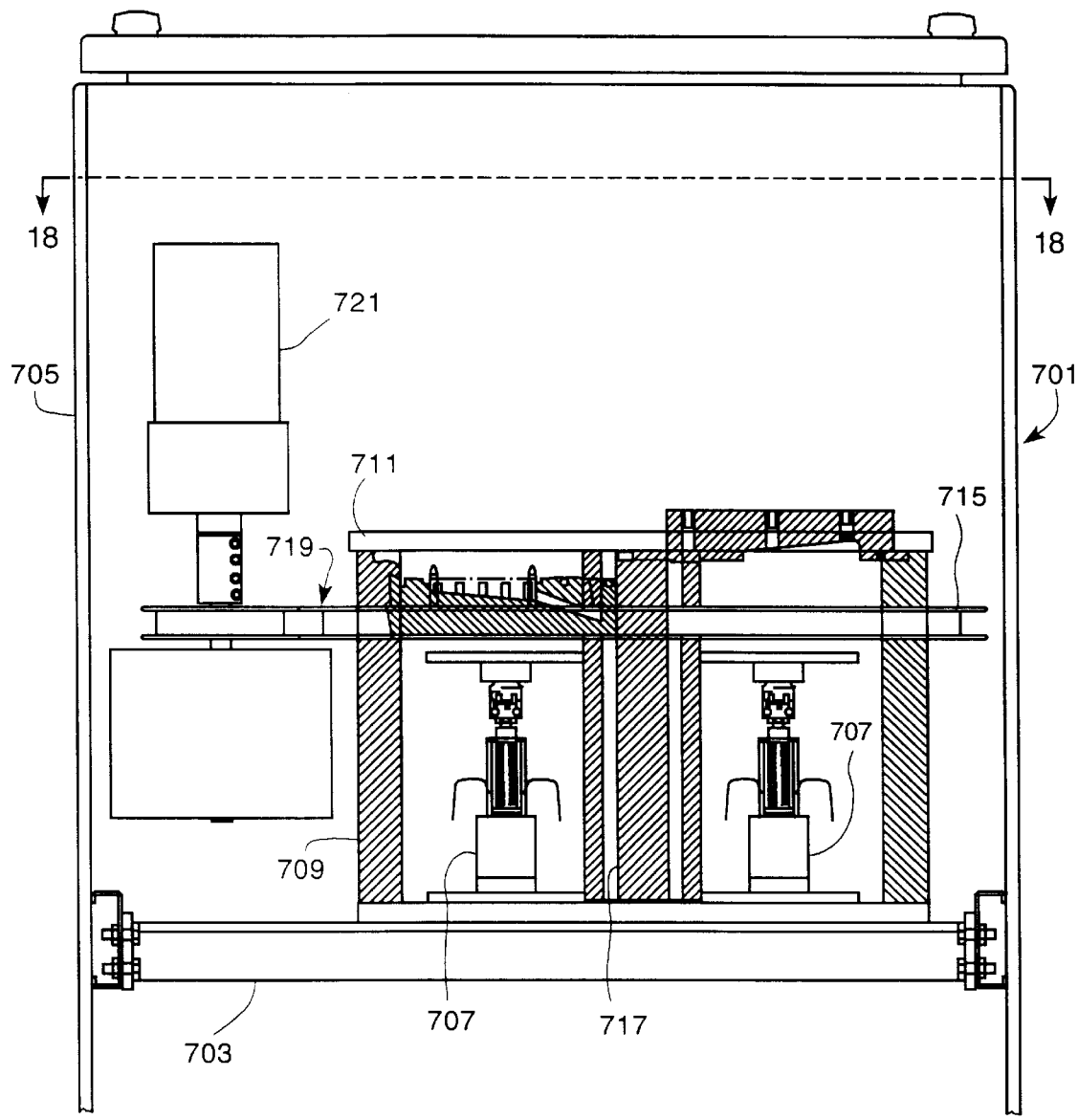
FIG. 17 is an interior elevation view of a collecting and measuring apparatus within a cabinet.
Figure 18:
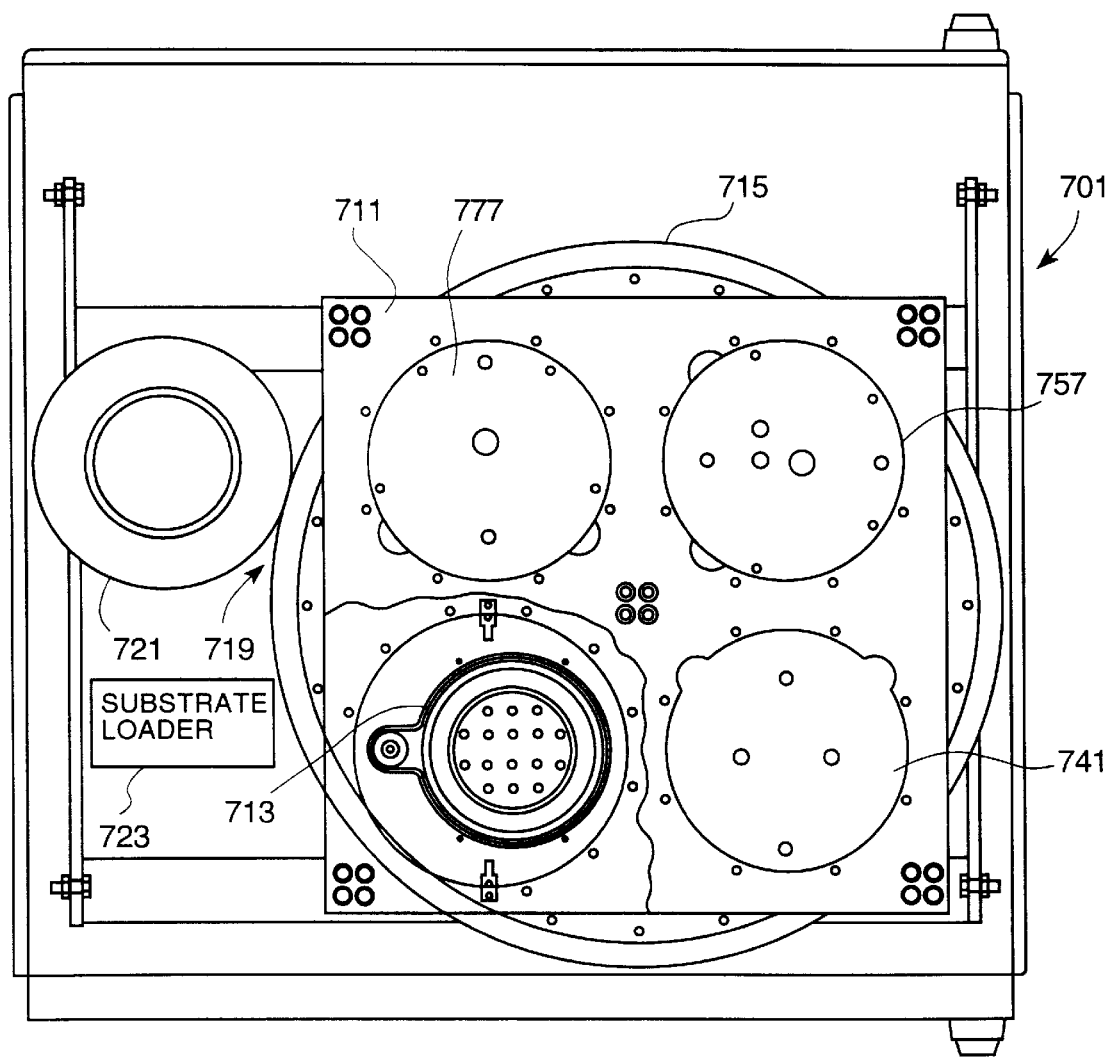
FIG. 18 is a plan view taken through line 18—18 of FIG. 17.

A specific embodiment of a measuring system 701 is illustrated in FIGS. 17–23. Referring now to FIGS. 17 and 18, system 701 includes a base plate 703 supported in cabinet 705. Base plate 703 supports four actuators 707 (only two shown) and a frame 709 that supports a top plate 711. Top portions of a collecting chamber, a drying chamber, and a measuring chamber are secured to top plate 711. Two substrate holders 713 are positioned 180 degrees apart on a substrate support plate 715, which rotates on a rotatable shaft 717 extending between base plate 701 and top plate 711. Substrate support plate is rotated with a friction drive 719 actuated by an electric motor.

A substrate loader 723 includes a substrates storage box and a mechanism for removing a substrate from the storage box, placing it in one of the substrate holders 713, removing the substrate from the holder 713 after the measurement, and replacing it in the storage box.

Figure 19:
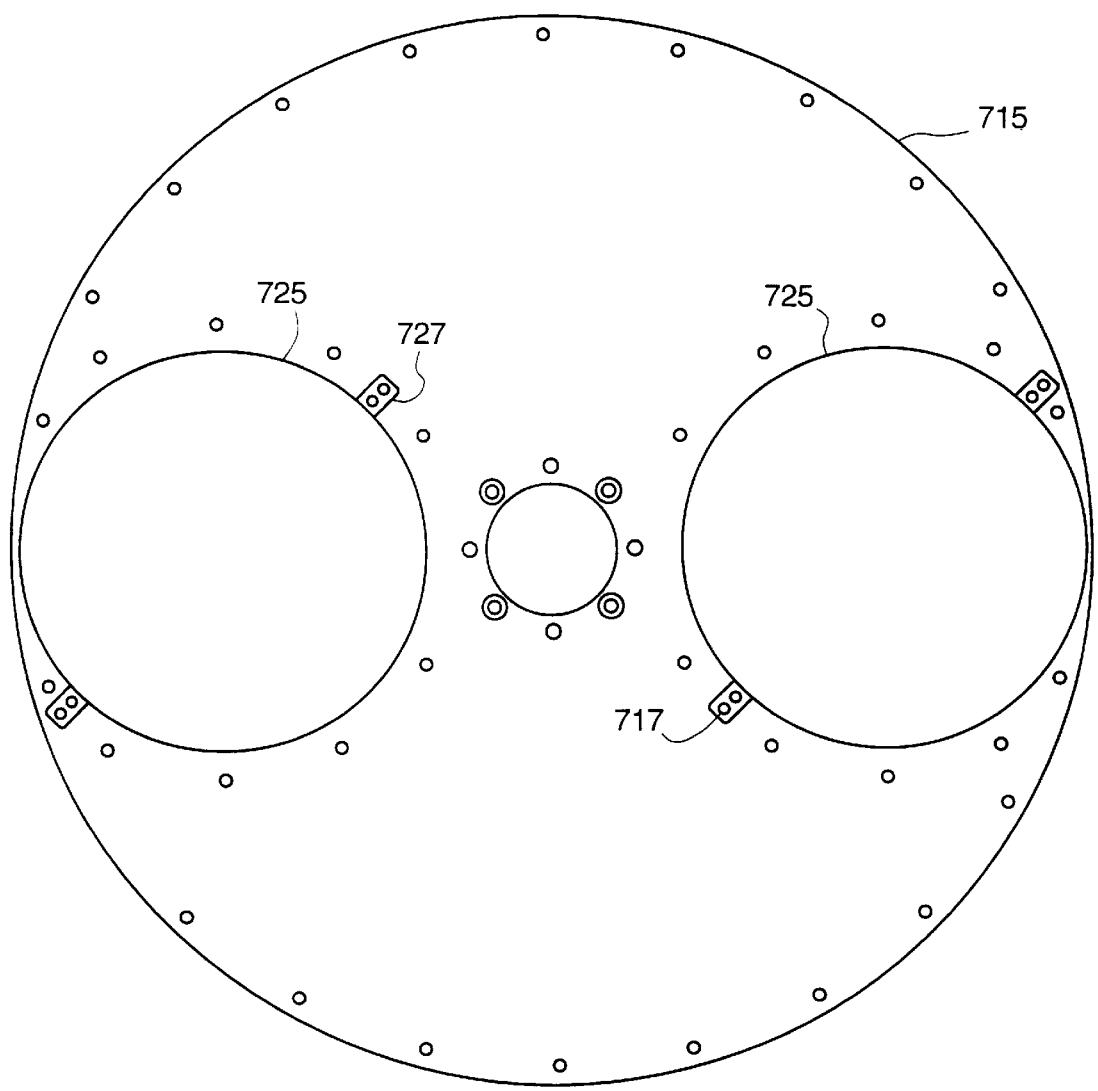
FIG. 19 is a plan view of a substrate holder plate.

Referring to FIG. 19, substrate support plate 715 includes two apertures 725 for substrate holders 713, which can slide up and down within apertures 725 by operating actuators 707. Each aperture 725 has key-ways 727 for maintaining the orientation of a substrate holder 713.

Figure 20B:
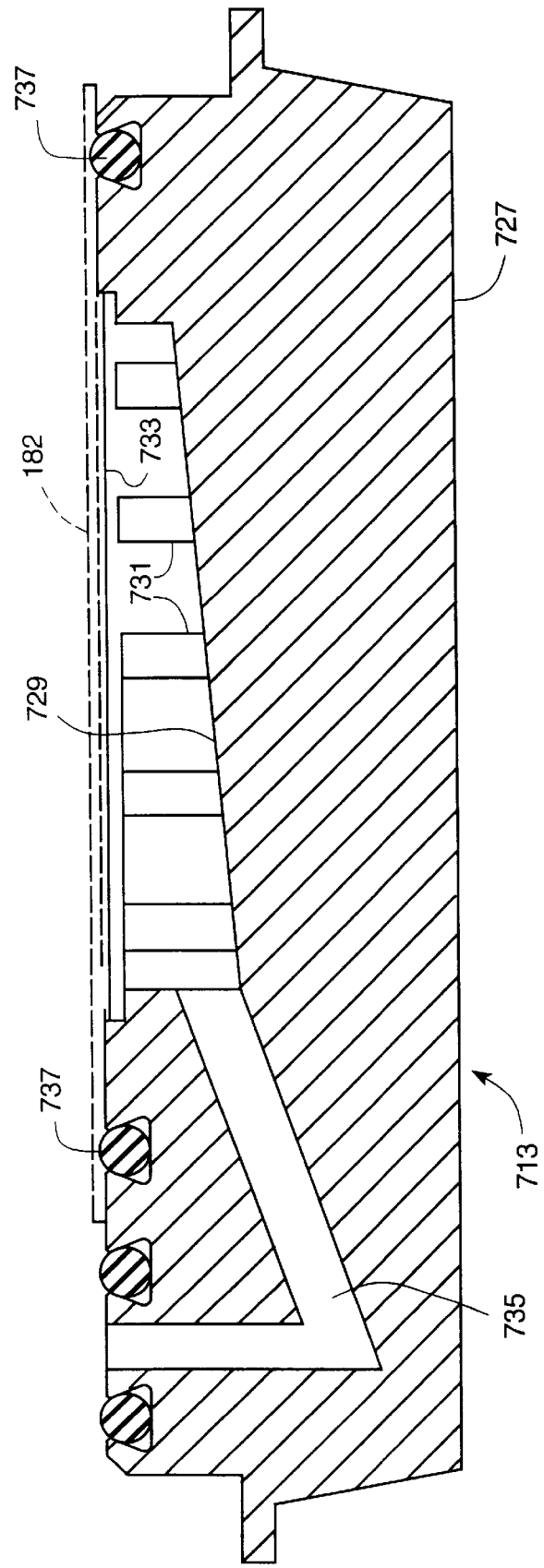
FIG. 20B is a section view through line 20B—20B of FIG. 20A.

Referring now to FIGS. 20A and 20B, substrate holder 713 forms a bottom portion of each of the collecting chamber, the drying chamber and the measuring chamber. Substrate holder 713 includes a machined base 727 made of stainless steel. Base 727 includes a slope-bottom chamber 729 having upstanding fingers 731 that support a removable wire mesh 733 (shown only in FIG. 20B). Substrate 182 rests on top of wire mesh 733. Chamber 729 connects to a drain line 735. A bottom o-ring 737 provides a seal against the bottom side of substrate 182. A smaller o-ring provides a seal for drain line 735. Base 727 also includes key-ways 739.

Figure 21B:
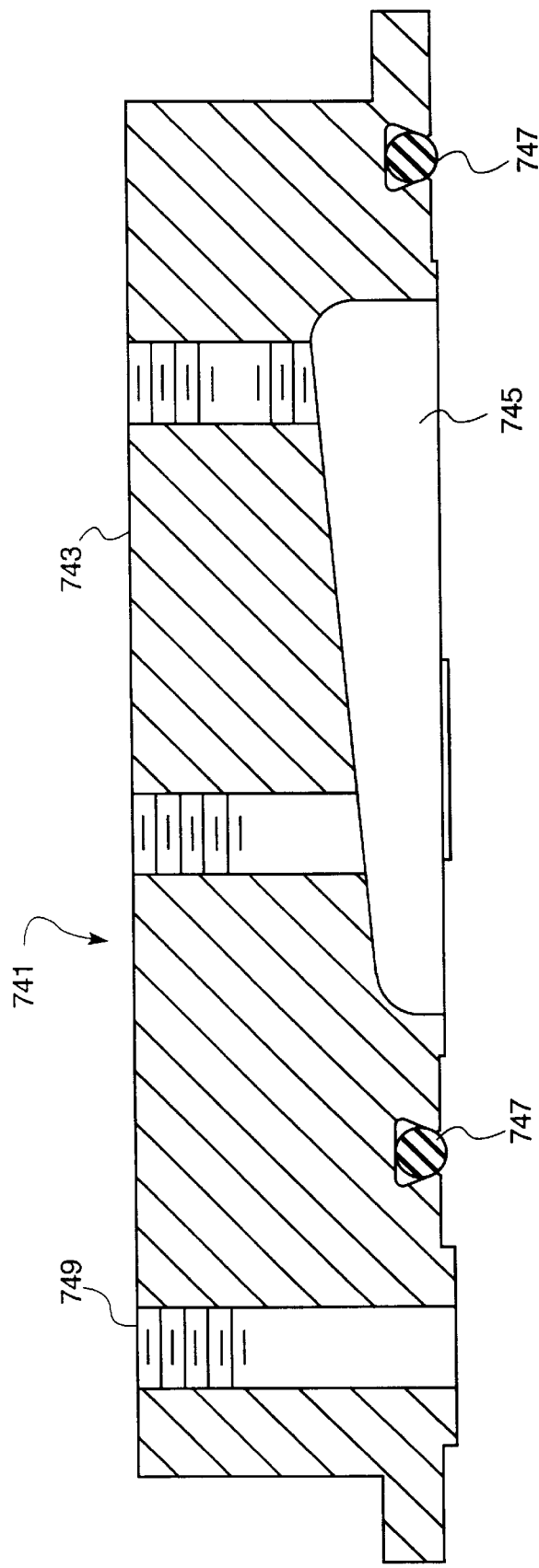
FIG. 21B is a section view through line 21B—21B of FIG. 21A.

Referring now to FIGS. 21A and 21B, a top portion of a collecting chamber 741 is machined from stainless steel and includes a body 743, an upper chamber 745, a top o-ring 747 surrounding the upper chamber 745 for sealing against the upper side of substrate 182. Body 743 includes a channel 749 for connecting to drain line 735, a channel for 751 for providing the fluid sample, a channel 753 for providing DI water, and a channel 755 for coupling to a line for measuring the pressure in upper chamber 745. Each of channels 751, 753 and 755 is threaded for coupling to a pipe fitting.

Figure 22:
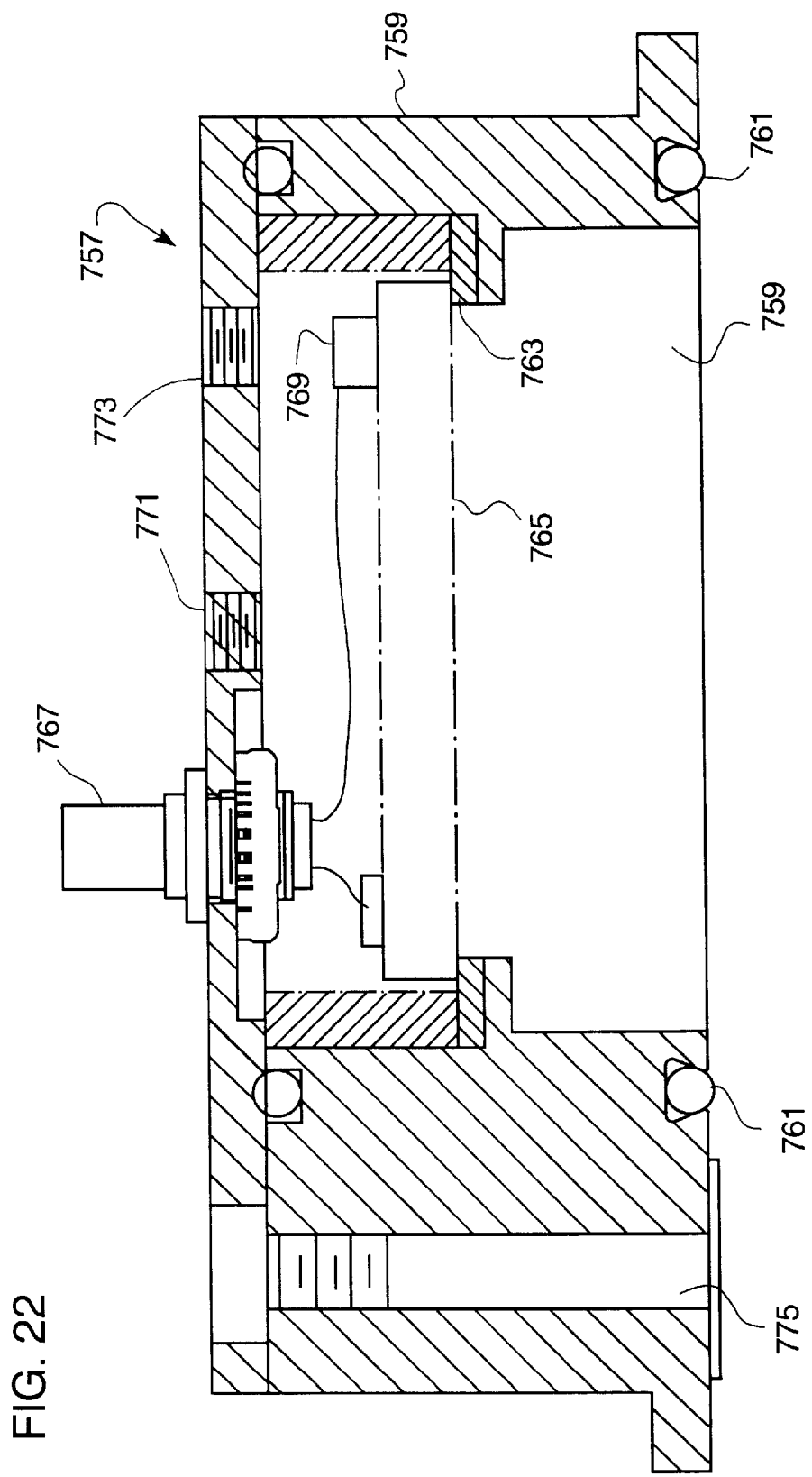
FIG. 22 is a section view of a drying chamber.

Referring now to FIG. 22, a drying chamber 757 includes a chamber 759 surrounded by an upper o-ring 761 for sealing against the upper side of substrate 182. An annular rim 763 within chamber 759 supports a heating elemement 765 above substrate 182. An electrical feedthrough 767 provides cables for controlling heating element 765 and for operating a thermocouple 769. Channels 771 and 773 extend into an upper portion of chamber 759 for coupling to vacuum and air. A side channel 775 couples to drain line 735 of one of the substrate holders 713.

Figure 23:
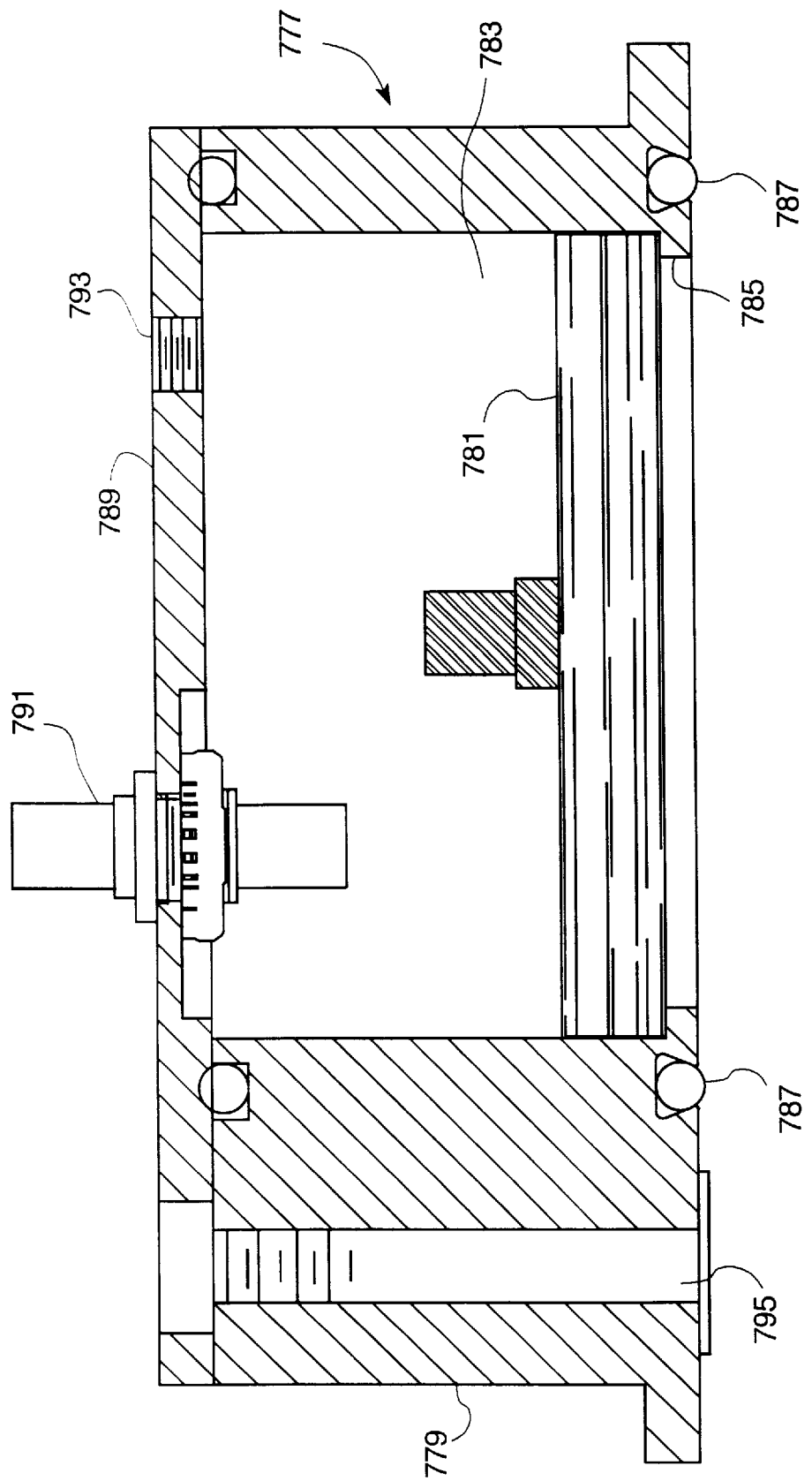
FIG. 23 is a section view of a measuring chamber.

Referring now to FIG. 23, a measuring chamber 777 includes a body 779 fabricated from stainless steel. A solid state detector 781 is positioned within a chamber 783 such that it is brought in close proximity to substrate 182 when substrate holder 713 is brought up against body 779. Detector 781 rests on an annular lip 785 within chamber 783. The opening of chamber 783 is surrounded by an upper o-ring 787 to provide a seal against the upper side of substrate 182. The top of chamber 783 is sealed by a plate 789. Plate 789 includes an electrical feedthrough 791 and a channel 793 extending into chamber 783 for coupling to vacuum. Body 779 also includes a side channel 795 that couples drain line 735 of substrate holder 713 to vent.

Other Embodiments

The surfaces of materials contained in other devices may be chemically treated with complexing agent-containing solutions to increase the deposition rates of solvated ions. For example, ion exchange materials or silica gels, silica sand, or zeolytes may be treated to increase the exchange rate between cations and anions in solution and the substrate, such as the gel or resin. Similarly, a surface acting as a filter may be chemically treated so as to increase the extraction of ions from an ion-containing solution. Alternatively, the active material in the film can include one or more of the following surface chemistries: mixed cation/anion ion exchange material, C-18, C-8, phenyl, cyano, silica, or any other suitable adsorbent material now known or developed at a later time.

EXAMPLES

The following examples relate to the chemically enhanced radionuclide detector.

Example 1

Chemical Enhancement

Figure 8:
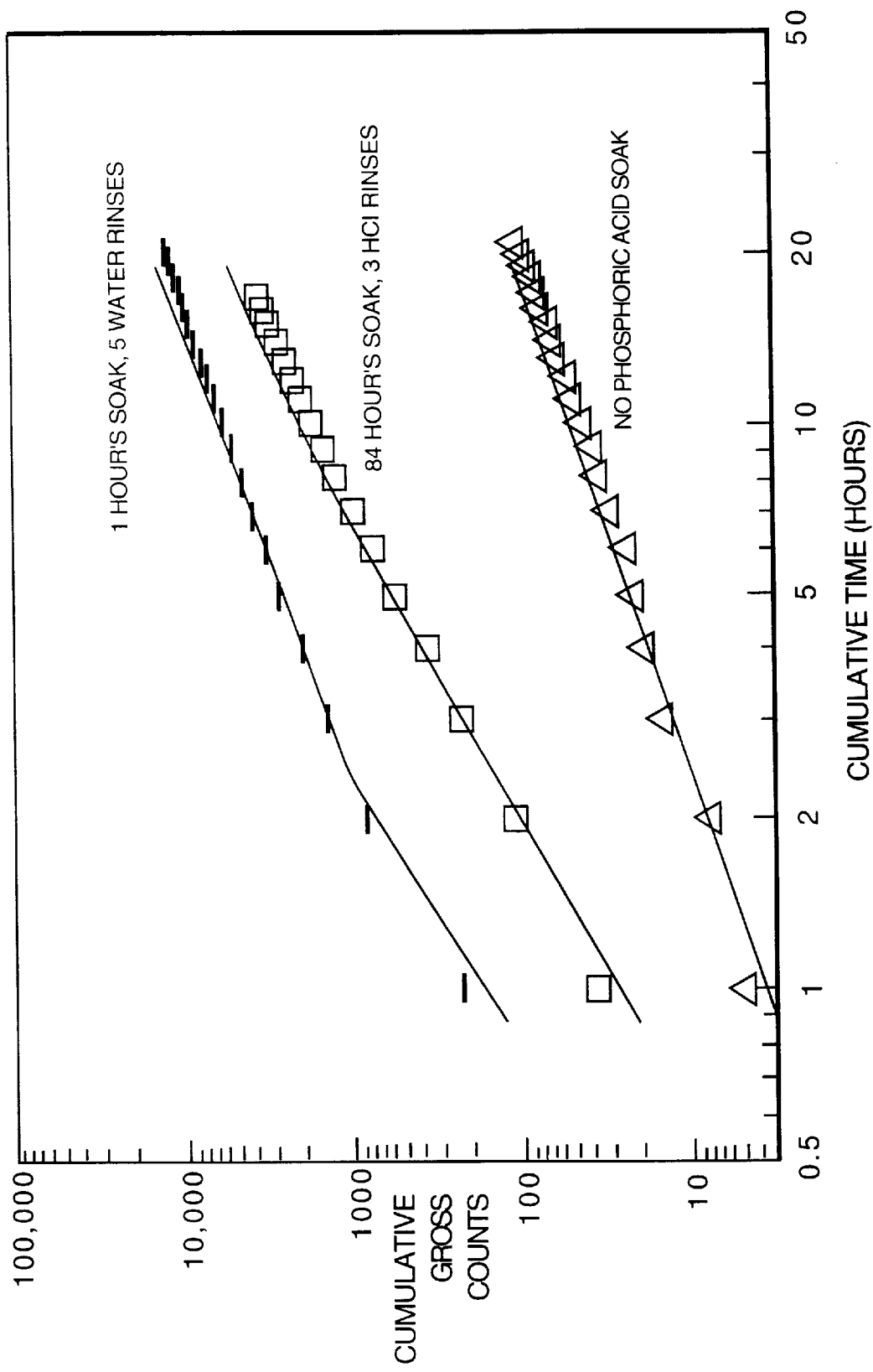
FIG. 8 is a plot showing the number of counts registered as a function of time for the conventional and chemically treated nuclide detectors.

In order to chemically enhance the detector surface, a 3-cm$^2$ silicon detector contained in a Quantrad Liquid Analyzer System 100 detector (Quantrad Sensor; 2360 Owen St., Santa Clara, Calif. 95054) was treated with: (a) a 37% (with water) hydrochloric acid solution for a time period of 5 minutes; (b) a deionized water rinse; and (c) a solution of aqueous phosphoric acid ($4.84\times10^{-4}$ by weight) dissolved in acetone (99%) and water (1%) for a time period of between 1 and 84 hours. A 10-ml sample of 10 ppb–10 ppm aqueous uranium prepared from an Aldrich AA standard solution was then added to the detector cup. FIG. 8 illustrates the improvement (approximately a factor of 100 compared to a conventional detector) in count rate between the chemically enhanced detectors (squares and bars in the plot) and the conventional detector (triangles). The plot indicates the robust character of the plated-out emitting film; even after 3 HCl rinses, the cumulative gross counts are between 80 and 100 times greater than those registered using a conventional detector.

The effectiveness of the phosphoric acid chemical treatment can be gauged not only by comparing the cumulative number of counts between treated and untreated detectors, but also by measuring the ratio between the alpha particle activity and the calculated total activity of the subject uranium solution. For example, the calculated total activity of a 10-cm$^3$ sample of liquid containing 10 ppm uranium is 4474 counts per hour (cph). A single-atom layer of hydrogen uranium phosphate generates nine counts per hour. In comparison, using the chemical enhancement method, a higher concentration of the uranium is plated out on the chemically enhanced detector, resulting in the equilibrium hourly counting rate approaching 1200 cph, or approximately 30% of the theoretical 4474 cph in the sample. The ability to measure such a large fraction of the total activity contained in the 10 ppm solution indicates the benefit of the chemical enhancement method.

Figure 9:
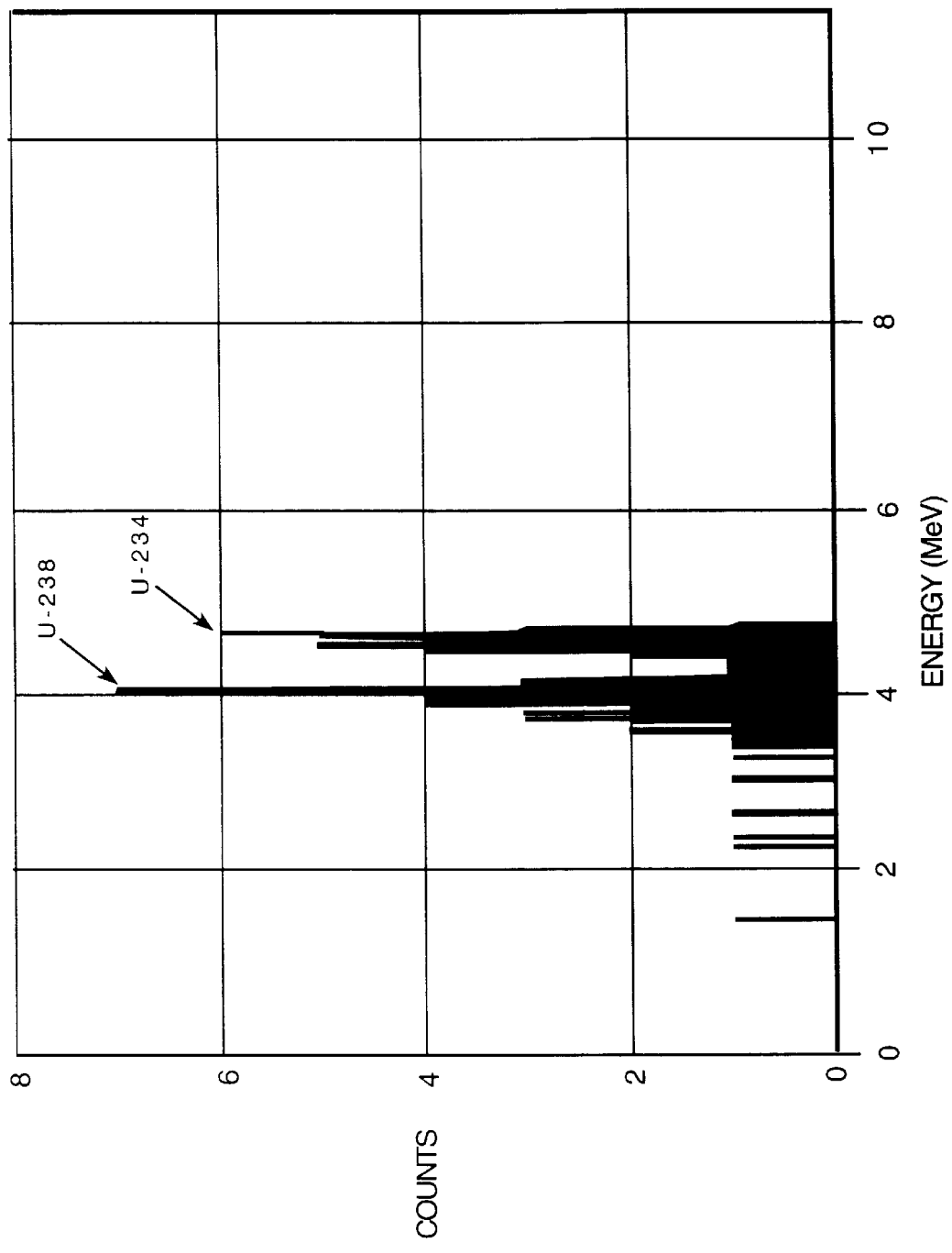
FIG. 9 is a spectrum taken from a uranium-containing sample using the chemically enhanced detector.

With reference now to FIG. 9, a spectrum taken over a time period of 45 minutes using the above-identified chemically enhanced detector clearly shows the presence of $U^{238}$ and $U^{234}$ in a 10-ppm uranium-containing solution. In this example, two factors appear to contribute to the enhanced performance of the detector. First, the detector was oven-dried for one hour to maximize the dryness of the silicon surface. Second, prior to adding the uranium-containing solution to the detector cup, the solution was neutralized with a 1% potassium hydroxide solution, and a two-hour time period was allowed to elapse. The solution was then placed in the detector cup, and monitored during the 45-minute sample counting period, resulting in clear identification of a $U^{238}$ peak (having a height of 7 counts) and a $U^{234}$ peak (6 counts). A total of 146 alpha particles were recorded in the 45-minute interval; 45 of these counts were integrated by gaussian peak analysis and identified as relating to $U^{238}$ or $U^{234}$, at an average error of approximately 30%. FIG. 9 clearly identifies the presence of the isotopes in the laboratory-prepared sample in a remarkably short count time. Conditions similar to those used in the test would allow easy identification of uranium at the NRC regulatory limit for releases to sewers, which is currently set at 4.43 ppm, during a short period of time.

Example 2

Pumped-Flow Mass Transfer

As discussed herein, the transfer of radionuclides to the silicon detector surface can be accelerated by using a jet-impingement method. This action serves to continually expose the detector surface to fresh uranium-containing solution, thereby maximizing the possibility of adsorbing uranium on the detector's face.

In order to determine the increase in detector sensitivity using the jet-impingement method, a non-chemically enhanced detector was modified to incorporate a single jet directly above the silicon surface. The inner diameter of the jet nozzle was 0.180 in. Sample flowing into the jet at a rate of 1.71 liters/min resulted in the sample having a velocity of 5.7 ft/sec emerging from the nozzle. In a separate experiment, the inner diameter of the nozzle was adjusted to 0.102 in., and a sample having a flow rate of 1.68 liters/min resulted in a velocity of 17.4 ft/sec after the nozzle.

In general, both experimental conditions resulted in the detection of uranium being significantly enhanced. In addition, the uranium plated out on the detector surface was not removed after washing the surface with water. A hydrochloric acid wash was used to effectively remove adsorbed radionuclides between samples, resulting in a very low background count. Furthermore, pumping of the sample solution to enhance mass transfer resulted in a change in the resultant spectral peak shape. The semi-gaussian peak envelope, normally indicative of a thin monolayer of plated-out radionuclide, was not observed. Instead, the peak had a non-gaussian shape and included a pronounced low-energy tail, indicating the presence of a thick alpha source.

Figure 10A:
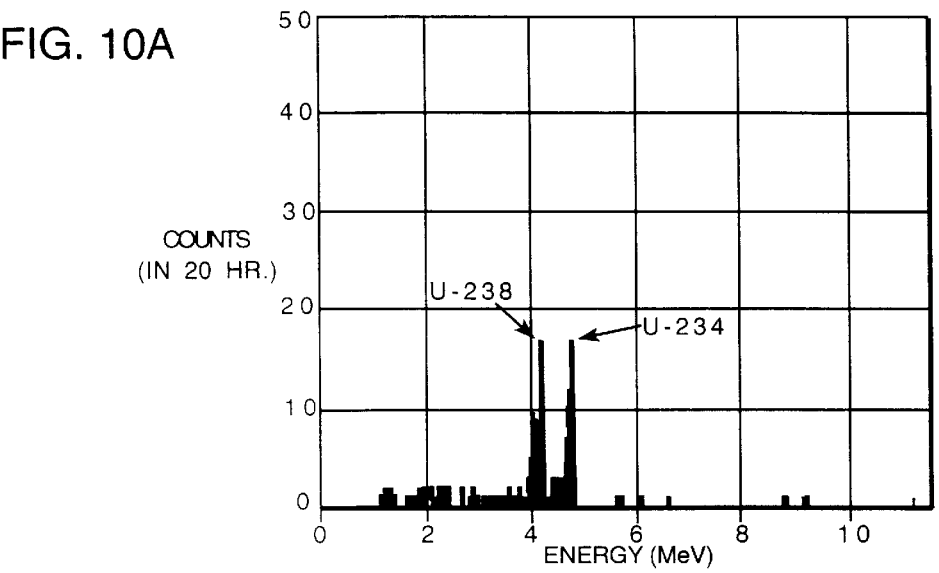
FIGS. 10A–10C show spectra taken from a uranium-containing sample when the velocities of the samples at the jet are, respectively, 0, 5.7, and 17.4 ft/sec.
Figure 10B:
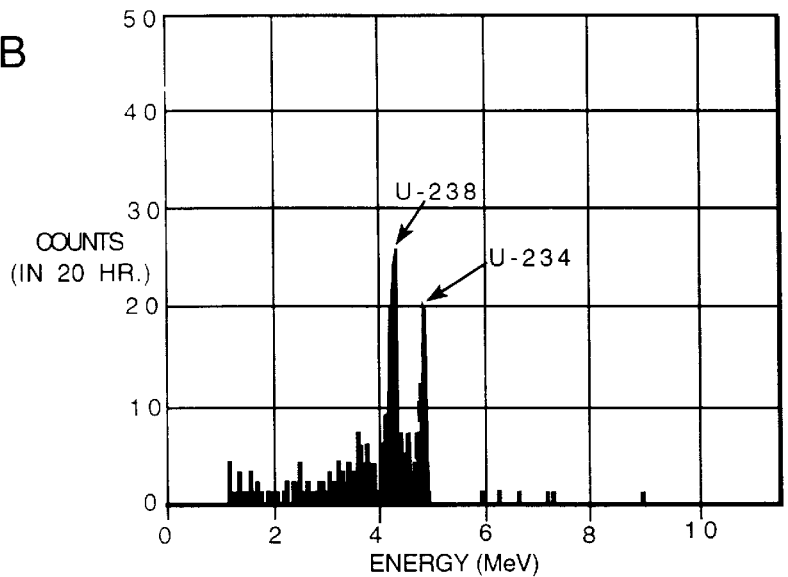
Figure 10C:
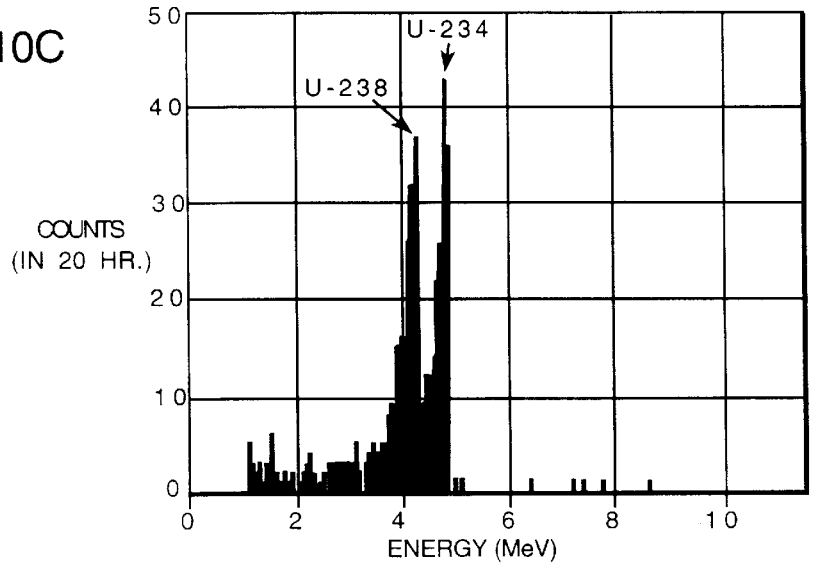

With reference to FIGS. 10A–10C, the ability of the jet-impingement detector to monitor uranium present as 10 ppm in an aqueous solution is increased with the velocity of the solution at the jet nozzle. The total counts registered after 20 hours (for a non-chemically treated detector) are listed in Table 2, below. In each case, the total counts were determined by subtracting out the background and totaling the appropriate channels for each peak.

TABLE 2

| Enhancement of Detection Efficiency Using Jet Impingement: Total Counts | | |
|---|---|---|
| Mode | Total Counts | Enhancement |
| Non-pumped (FIG. 10A) | 162 ± 14 | — |
| 5.7 ft/sec Jet (FIG. 10B) | 189 ± 17 | 1.17 |
| 17.4 ft/sec Jet (FIG. 10C) | 439 ± 27 | 2.71 |

The results after 20 hrs. based on peak height alone are summarized in Table 3, below.

TABLE 3

| Enhancement of Detection Efficiency Using Jet Impingement: Average Peak Height | | |
|---|---|---|
| Mode | Average Peak Height (counts) | Enhancement |
| Non-pumped (FIG. 10A) | 17 | — |
| 5.7 ft/sec Jet (FIG. 10B) | 23 | 1.35 |
| 17.4 ft/sec Jet (FIG. 10C) | 40 | 2.35 |

The results summarized in Tables 2 and 3 indicate that the use of higher pumping flow rates and/or multiple nozzles will continue to increase the enhancement effect. In particular, it is expected that additional increases in the nozzle velocity will yield an enhancement factor well in excess of 2.71; detection sensitivity is expected to increase by a factor of at least 4 at higher jet velocities.

Example 3

Enhanced Detector Using Combined Chemical Enhancement and Jet Impingement

The combination of chemical enhancement and jet impingement is expected to allow increased enhancement of the detector sensitivity relative to the use of either of these enhancing techniques, alone. As discussed in Example 1, use of chemical enhancement increases the sensitivity of the detector by more than two orders of magnitude. The time required for a conventional detector to detect the regulatory limit of 4.43 ppm of a solution of aqueous uranium is approximately 20 hours. Thus, by chemically enhancing the surface of the detector, this time period is shortened to approximately 102 minutes. Further implementation of the jet impingement technique is expected to reduce this time period in a linear, additive way, resulting in a time period of as low as 26 minutes to count the regulatory uranium concentration.

The next example is related to the ion-exchange resin treated substrate.

Example 4

Ion Exchange Resin Radionuclide Collecting

Figure 24:
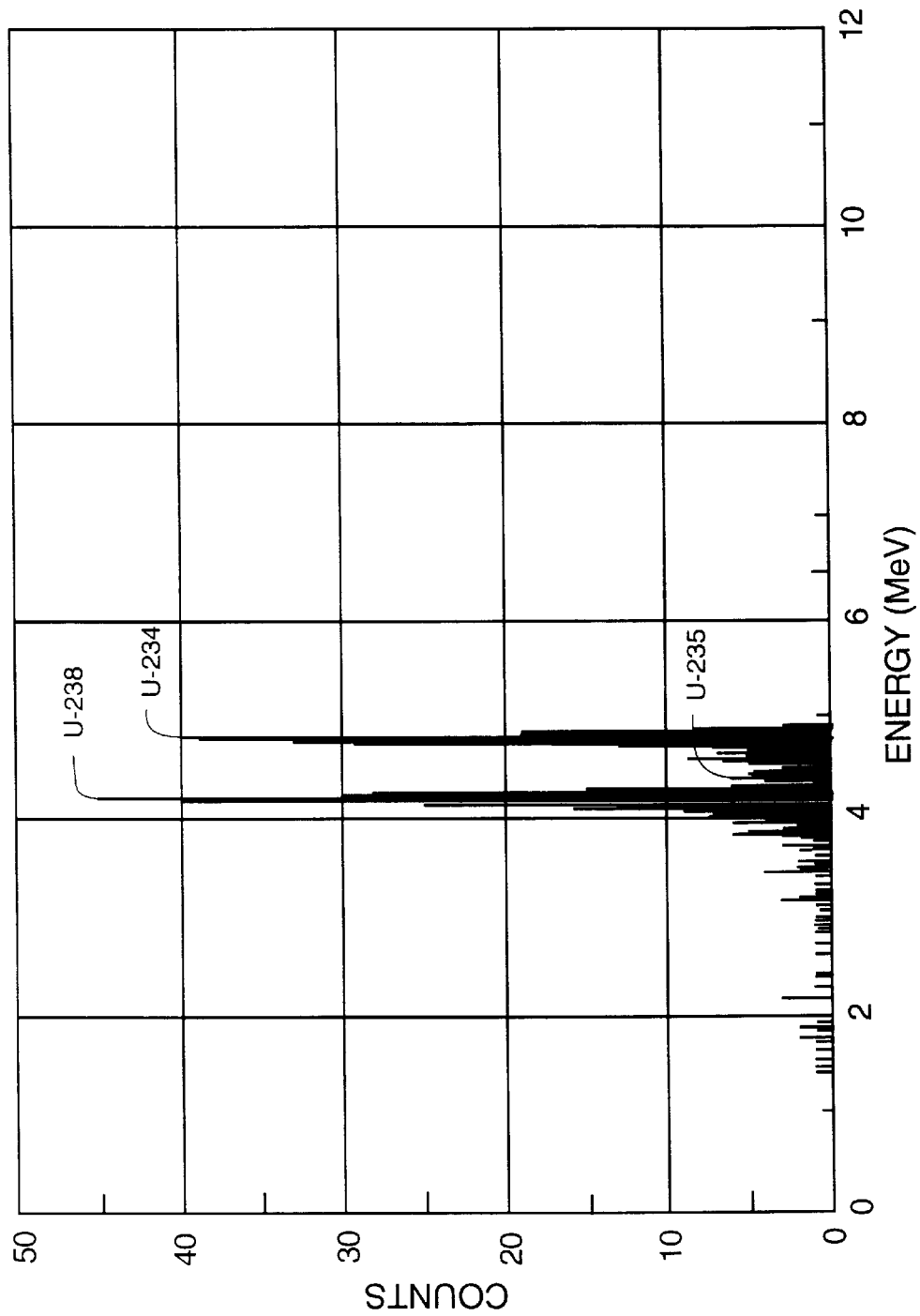
FIG. 24 is a spectrum taken from a uranium-containing sample using the ion exchange resin enhanced collecting substrate.
Figure 25:
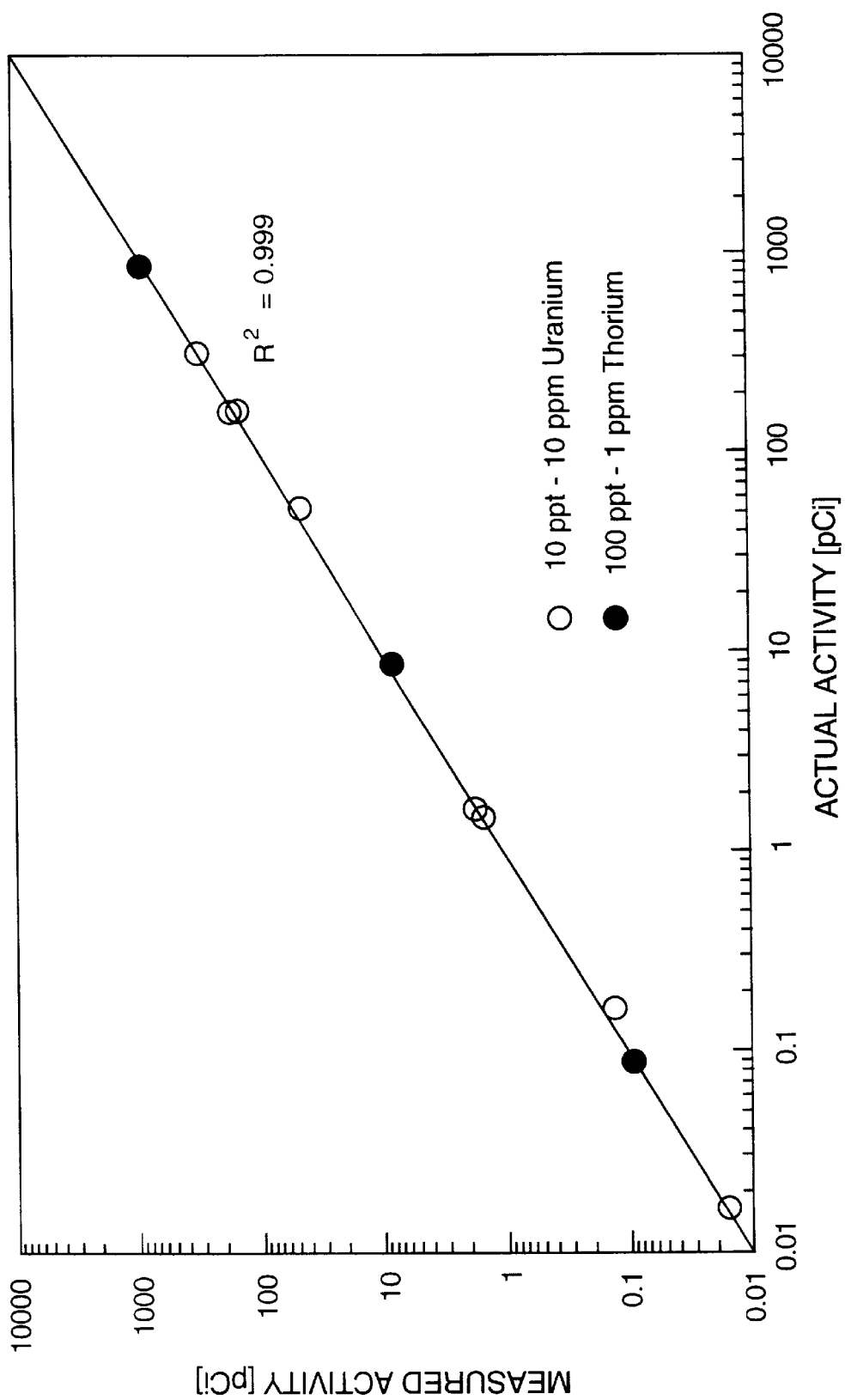
FIG. 25 is a plot of measured activity versus actual activity for two types of low level samples.
Figure 26:
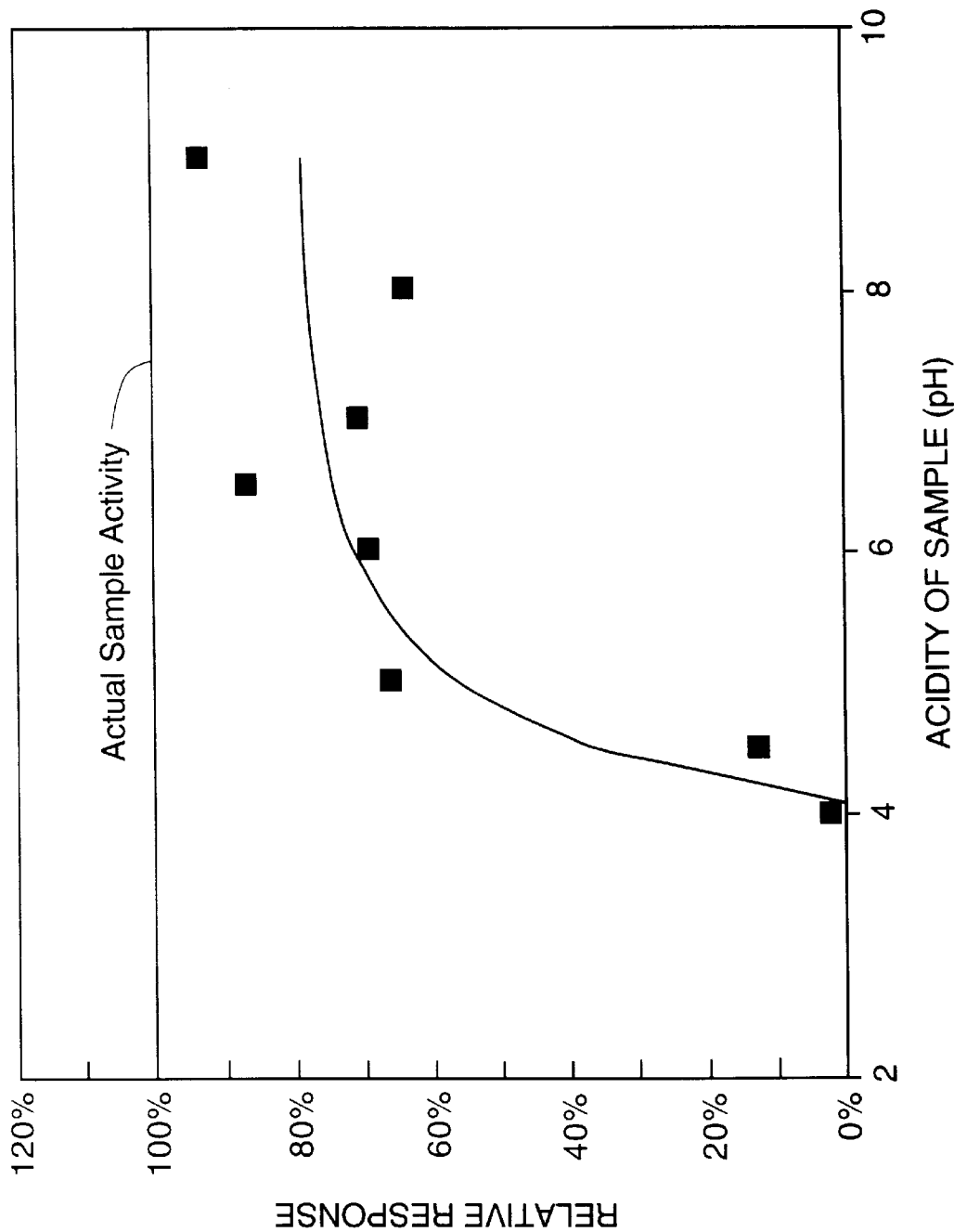
FIG. 26 is a plot of relative response versus sample pH, illustrating the flat response at high pH of a monitoring system according to the invention.

Referring now to FIG. 24, on-line alpha monitor results are shown for an RO material substrate soaked for 20 minutes in a 9.8 ppm uranium solution. The substrate, which had a surface area of 1.0 cm$^2$ was dried to remove all water, then placed about 2 mm from the surface of a Si diode alpha detector in an evacuated detection chamber. Interestingly, the RO material provided equal count rates after soaks of 5, 10 and 20 minutes, meaning that uranium is collected very rapidly. 100% retrieval of dilute radionuclides should be possible using this SPE technique, thereby improving detection limits.

While the invention has been shown and described in connection with embodiments in which surfaces are treated with complexing agent-containing materials prior to contact of the surface with a sample, complexing agent-containing materials may be supplied while the sample is in contact with the surface, as an alternative to, or in addition to, pre-treatment of the surface. For example, a solution of complexing agent-containing material may be released near the surface on which ion deposition is desired, either as part of or separate from a jet impingement nozzle.

Other embodiments are within the scope of the following claims.

What is claimed is:

1. An apparatus for detecting low levels of an analyte in a fluid sample with a substrate that includes a sorbent material, comprising:
   a collecting apparatus, including a collecting chamber adapted to expose the substrate to a measured amount of the fluid sample such that an analyte in the fluid sample can be collected by the sorbent material;
   a measuring system, including a measuring chamber and a detector responsive to a characteristic of the analyte when the substrate is inside the measuring chamber;
   a transport mechanism cooperatively structured with the collecting chamber and the measuring chamber to transport the substrate into and out from the collecting chamber and subsequently into and out from the measuring chamber, and
   a developing apparatus adapted to prepare the substrate for measuring the characteristic of the analyte after being exposed to the fluid sample in the collecting chamber and prior to being transported to the measuring chamber, wherein the developing apparatus includes a drying chamber, and wherein the transport mechanism is also cooperatively structured with the drying chamber to transport the substrate into and out from the drying chamber after being transported out from the collecting chamber and before being transported into the measuring chamber, and
   wherein the transport mechanism comprises a movable substrate holder that forms a bottom portion of each of the collecting chamber, the drying chamber and the measuring chamber.

2. The apparatus of claim 1, wherein the substrate comprises a central region which carries the sorbent material, and a thin rim surrounding and supporting the central region about its peripheral edge, and wherein each of the collecting chamber, the drying chamber and the measuring chamber comprises a top portion cooperatively structured with the substrate holder to provide a seal against the rim of the substrate with the substrate positioned therebetween.

3. An apparatus for detecting low levels of one or more dissolved analytes in a liquid fluid sample with a substrate that includes a central region having a sorbent material, and a thin rim surrounding and supporting the central region about its peripheral edge, the apparatus comprising:
   a collecting apparatus, including a collecting chamber adapted to expose the substrate to a measured amount of the fluid sample such that dissolved analytes in the fluid sample can be collected by the sorbent material;
   a developing apparatus, including a drying chamber structured to dry the substrate after being exposed to the fluid sample; and
   a measuring system, including a measuring chamber and a detector being structured and arranged with the chamber to provide a signal indicative of analytes adsorbed on the substrate when the substrate is positioned within the measuring chamber, wherein each of the chambers includes a top portion structured to provide a seal against an upper surface of the rim of the substrate.

4. The apparatus of claim 3, further comprising a transport mechanism cooperatively structured with the collecting chamber, the drying chamber and the measuring chamber to transport the substrate in steps to the collecting chamber, then to the drying chamber and then to the measuring chamber, wherein the transport mechanism includes a movable substrate holder that forms a bottom portion of each of the collecting chamber, the drying chamber and the measuring chamber, and wherein the top portion of each of the collecting chamber, the drying chamber and the measuring chamber is cooperatively structured with the substrate holder to also provide a seal against a lower surface of the rim of the substrate with the substrate positioned therebetween.

5. The apparatus of any one of claims 2 and 4,
   wherein the top portion of each of the chambers is secured to a stationary upper chamber support, and
   wherein the transport mechanism further includes:
      a movable substrate holder support positioned below the upper chamber support and allowing the substrate support to move vertically;
      a drive mechanism that moves the substrate holder support such that the substrate holder is transported between positions opposed to the top portion of each of the chambers; and
      an actuator system structured to move the substrate support when in one of the opposed positions between a lowered position and a raised position sealing the substrate between the substrate holder and the top portion of the chamber to which the substrate holder is opposed.

6. The apparatus of claim 5, wherein the substrate holder support comprises a substrate support plate with an aperture in which the substrate support is slidably movable, and wherein the drive mechanism rotates the substrate support plate.

7. The apparatus of claim 5, further comprising a substrate storage box adapted to hold the substrate, and a second transport mechanism adapted to remove the substrate from the storage box, place the substrate in the substrate holder, remove the substrate from the substrate holder after the measurement, and replace the substrate in the storage box.

8. The apparatus of any one of claims 2 and 4, wherein the substrate holder comprises: a substrate holder body forming a lower chamber open at the top and having a sloped bottom; a bottom o-ring positioned on an upper face of the substrate holder body around the chamber to provide a seal against a bottom side of the rim of the substrate; and a substrate holder drain line extending from the chamber to an outlet in the upper face of the substrate holder body.

9. The apparatus of claim 8, wherein the substrate holder further comprises upstanding fingers extending from the sloped bottom and a wire screen supported on the fingers to provide support for the substrate.

10. The apparatus of claim 8, wherein the top portion of the collecting chamber comprises a collecting chamber body forming an upper chamber open at the bottom; a top o-ring positioned on a lower face of the collecting chamber body around the upper chamber to provide a seal against a top side of the outer rim of the substrate; a collecting chamber drain line adapted to connect to the substrate holder drain line; and a fluid sample channel extending from the upper chamber for providing the fluid sample to the upper chamber.

11. The apparatus of claim 10, wherein the top portion of the collecting chamber further comprises a pressure channel extending from the upper chamber for coupling to a line for measuring a pressure inside the upper chamber, and a third channel extending from the upper chamber for providing water or calibration solution to the upper chamber.

12. The apparatus of claim 8, wherein the top portion of the drying chamber comprises a drying chamber body forming an upper chamber open at the bottom; a top o-ring positioned on a lower face of the drying chamber body around the upper chamber to provide a seal against a top side of the outer rim of the substrate; a heating element within the upper chamber; a temperature sensor within the upper chamber; an air channel for coupling the upper chamber to air; and a vacuum channel for coupling the upper chamber to vacuum.

13. The apparatus of claim 12, wherein the top portion of the drying chamber further comprises a drying chamber drain line adapted to connect to the substrate holder drain line.

14. The apparatus of claim 8, wherein the top portion of the measuring chamber comprises:
 a measuring chamber body forming an upper chamber open at the bottom;
 a top o-ring positioned on a lower face of the measuring chamber body around the upper chamber to provide a seal against a top side of the outer rim of the substrate;
 the detector positioned within the upper chamber;
 a vacuum channel for coupling the upper chamber to vacuum;
 and a vent line adapted to connect to the substrate holder drain line for venting the measuring chamber.

15. The apparatus of claim 8,
 wherein the top portion of the collecting chamber, the drying chamber and the measuring chamber each comprises a respective upper chamber body forming an upper chamber open at the bottom, and a top o-ring positioned on a lower face of the upper chamber body around the upper chamber to provide a seal against a top side of the rim of the substrate;
 wherein the top portion of the collecting chamber further comprises a collecting chamber drain line adapted to connect to the substrate holder drain line, a fluid sample channel for providing the fluid sample to the upper chamber of the collecting chamber, and a pressure channel extending from the upper chamber for coupling to a line for measuring a pressure inside the upper chamber;
 wherein the top portion of the drying chamber further comprises a heating element within the upper chamber, a temperature sensor within the upper chamber, an air channel for coupling the upper chamber to air, and a vacuum channel for coupling the upper chamber to vacuum; and
 wherein the top portion of the measuring chamber comprises a vacuum channel for coupling the upper chamber to vacuum; a vent line adapted to connect to the substrate holder drain line for venting the measuring chamber, and wherein the detector is positioned within the upper chamber.

16. The apparatus of any one of claims 1 and 3, wherein the detector is adapted for one of measuring laser induced fluorescence, measuring x-ray induced fluorescence, measuring radioactive emissions, measuring infrared spectra, and measuring Raman spectra.

17. The apparatus of any one of claims 1 and 3, wherein the collecting apparatus is adapted for exposing the substrate to a gaseous fluid sample.

18. The apparatus of claims 1 and 3, wherein the collecting apparatus is adapted for exposing the substrate to a liquid fluid sample.

19. The apparatus of claim 1, wherein the substrate further comprises a central region which carries the sorbent material and a rim surrounding and supporting the central region.

20. The apparatus of any one of claims 3 and 19, wherein the central region comprises a porous medium.

21. The apparatus of claim 20, further comprising the substrate, wherein the rim includes a thin, non-porous material.

22. The apparatus of claim 21, wherein the rim further includes a stiffening border holding the thin, non-porous material.

23. The apparatus of claim 22, wherein the stiffening border provides surfaces for sealing between top and bottom portions of each of the collecting chamber, the drying chamber and the measuring chamber.

24. The apparatus of claim 22, wherein the rim includes a rectilinear peripheral edge.

25. The apparatus of claim 22, wherein the rim includes a round peripheral edge.

26. The apparatus of claim 20, wherein the collecting apparatus is structured and arranged to pass the measured amount of fluid sample through the porous media.

27. The apparatus of claim 26, wherein the collecting apparatus includes a mechanism adapted to pass the measured amount of the fluid sample through the porous media by employing at least one of a vacuum and a positive pressure to encourage the measured amount of the fluid sample to pass through the porous media.

28. The apparatus of claim 1, wherein the substrate further comprises an elongated, flat strip including a media carrying the sorbent material, and wherein the transport mechanism is cooperatively structured with the collecting chamber and the measuring chamber to continuously feed the strip sequentially into and out of the collecting chamber and then the measuring chamber.

29. The apparatus of any one of claims 1 and 3, wherein the detector is adapted for providing signals indicative of radioactive emissions from the analyte and the measuring system further comprises processing electronics responsive to the signals from the detector for determining a total activity level of the fluid sample based upon the measured amount of the fluid sample and a measured emission rate from the substrate.

30. The apparatus of claim 29, wherein the measuring system further comprises processing electronics responsive to the signals from the detector for providing a spectrum of the measured emissions and identifying species of radionuclides in the sample fluid based on the spectrum.

31. The apparatus of claim 30, wherein the processing electronics are configured to determine a concentration of the identified species based on the measured amount of fluid sample and the spectrum.

32. The apparatus of any one of claims 1 and 3, further comprising the substrate.

33. The apparatus of claim 32, wherein the sorbent material comprises an ion exchange resin.

34. The apparatus of claim 32, and the sorbent material comprises C-8, C-18 or the like for adsorbing an organic analyte.

35. The apparatus of claim 1, wherein the collecting apparatus is structured and arranged to pass the measured amount of the fluid sample over the substrate.

36. The apparatus of claim 35, further comprising the substrate, wherein the substrate comprises an approximately 50:50 mix of polyethylene and an ion exchange resin extruded into a thin film on a media, the ion exchange resin being finely ground before being mixed with the polyethylene and extruded.

37. The apparatus of claim 1, further comprising the substrate, wherein the substrate further comprises a reverse osmosis (RO) membrane having a fabric backing on one side, the sorbent material comprising a lacquer containing an ion exchange material applied to another side of the RO membrane, the ion exchange material being finely divided in the lacquer.

38. The apparatus of claim 1, wherein the collecting apparatus includes a flow mechanism structured and arranged to increase a flow rate of the measured amount of fluid sample contacting the substrate to increase a collecting deposition rate of the analyte on the substrate.

39. The apparatus of claim 38, wherein the flow mechanism is adapted to deliver the measured amount of fluid sample to the substrate as a high-pressure stream onto the thin film.

40. The apparatus of claim 38, wherein the flow mechanism is adapted to stir the measured amount of fluid sample.

* * * * *